US008538342B2

(12) United States Patent
Morita et al.

(10) Patent No.: US 8,538,342 B2
(45) Date of Patent: Sep. 17, 2013

(54) RADIO STATION APPARATUS, RADIO RESOURCE CONTROL METHOD, RECORDING MEDIUM STORING RADIO STATION CONTROL PROGRAM, AND RADIO COMMUNICATION SYSTEM

(75) Inventors: Motoki Morita, Tokyo (JP); Kojiro Hamabe, Tokyo (JP)

(73) Assignee: NEC Corporation, Tokyo (JP)

( * ) Notice: Subject to any disclaimer, the term of this patent is extended or adjusted under 35 U.S.C. 154(b) by 152 days.

(21) Appl. No.: 12/920,301

(22) PCT Filed: Feb. 20, 2009

(86) PCT No.: PCT/JP2009/052997
§ 371 (c)(1),
(2), (4) Date: Aug. 30, 2010

(87) PCT Pub. No.: WO2009/119212
PCT Pub. Date: Oct. 1, 2009

(65) Prior Publication Data
US 2011/0003557 A1 Jan. 6, 2011

(30) Foreign Application Priority Data

Mar. 26, 2008 (JP) .................................. 2008-080744

(51) Int. Cl.
*H04B 17/00* (2006.01)
(52) U.S. Cl.
USPC .................. 455/67.11; 455/67.14; 455/67.15; 455/67.13; 455/447; 455/501; 455/509; 455/436
(58) Field of Classification Search
USPC ................. 455/500–528, 450–456, 436–439, 455/444, 445, 447, 448, 67.11–67.16; 370/318–320
See application file for complete search history.

(56) References Cited

U.S. PATENT DOCUMENTS 6,771,978 B1 * 8/2004 Kayama et al. ............... 455/522
6,801,759 B1 * 10/2004 Saifuddin ................... 455/127.1
(Continued)

FOREIGN PATENT DOCUMENTS

DE 2428937 A1 1/1975
GB 2 428 937 A 2/2007
(Continued)

OTHER PUBLICATIONS

Office Action, dated Jul. 9, 2013, issued by the Japanese Patent Office in counterpart Japanese Application No. 2010-505459.

*Primary Examiner* — Fayyaz Alam
*Assistant Examiner* — Mohammed Rachedine
(74) *Attorney, Agent, or Firm* — Sughrue Mion, PLLC

(57) ABSTRACT

To provide good communication quality inside a building while suppressing interference exerted on communication of other radio stations by radio waves leaked outside the building. A femto base station 1 performs radio communication with mobile stations 6-1 and 6-2. The femto base station 1 includes a radio resource control unit 15. The radio resource control unit 15 obtains a measured value of a reception quality level that is obtained by the femto base station 1 and the mobile stations 6-1 and 6-2 by measuring the reception quality level of an external radio signal S1. Further, the radio resource control unit 15 determines a radio parameter relating to radio communication between the femto base station 1 and the mobile stations 6-1 and 6-2 based on a relative comparison between a plurality of reception quality levels. The external radio signal S1 is a radio signal transmitted from an external radio station 9 that is different from any of the femto base station 1 and the mobile stations 6-1 and 6-2.

37 Claims, 31 Drawing Sheets

(56) References Cited

U.S. PATENT DOCUMENTS

| | | | |
|---|---|---|---|
| 6,963,752 B1 * | 11/2005 | Nilsson | 455/522 |
| 7,016,686 B2 * | 3/2006 | Spaling et al. | 455/453 |
| 7,936,690 B2 * | 5/2011 | Willenegger | 370/252 |
| 2004/0038682 A1 * | 2/2004 | Persson et al. | 455/436 |
| 2006/0025151 A1 * | 2/2006 | Karaoguz et al. | 455/455 |
| 2007/0218914 A1 | 9/2007 | Mori et al. | |
| 2007/0257796 A1 | 11/2007 | Easton et al. | |
| 2009/0042596 A1 * | 2/2009 | Yavuz et al. | 455/522 |
| 2010/0283682 A1 * | 11/2010 | Heidari-Bateni et al. | 342/387 |

FOREIGN PATENT DOCUMENTS

| | | |
|---|---|---|
| JP | 2007-251755 A | 9/2007 |
| JP | 2010521100 A | 6/2010 |

\* cited by examiner

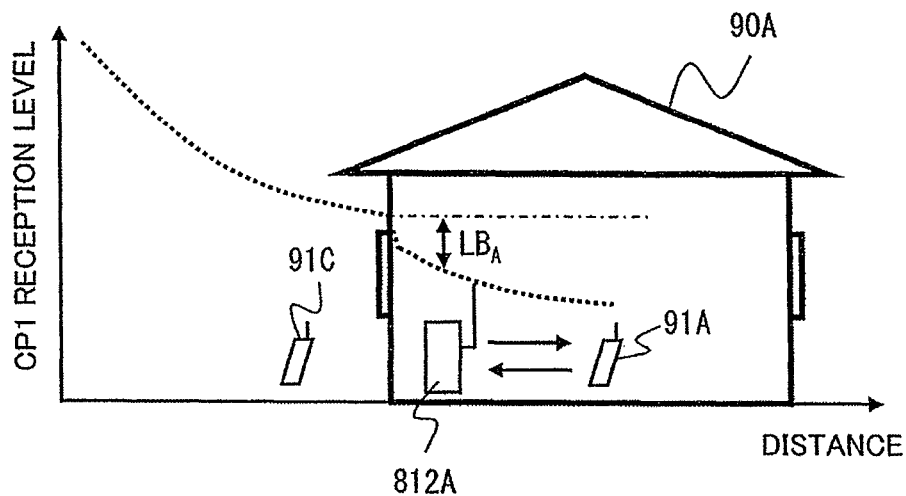
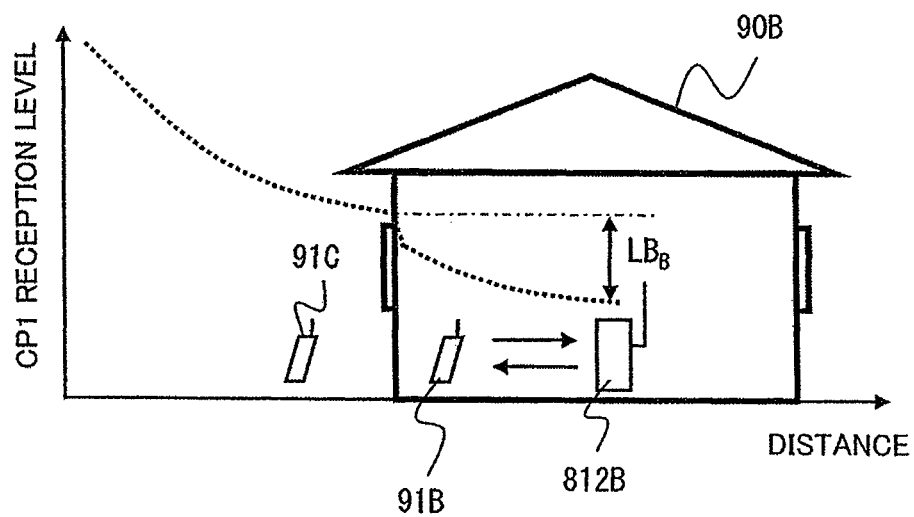
Fig. 33

RADIO STATION APPARATUS, RADIO RESOURCE CONTROL METHOD, RECORDING MEDIUM STORING RADIO STATION CONTROL PROGRAM, AND RADIO COMMUNICATION SYSTEM

TECHNICAL FIELD

The present invention relates to a radio resource control technique used in communication between radio stations.

BACKGROUND ART

In recent years, as the demand for indoor voice communication and data communication has grown due to the spread of mobile phones, the development of a home-use base station that can be installed inside a building such as a user's house and a small-scale office has been pursued. Since an area covered by the base station that can be installed indoors is considerably smaller than that of an existing base station installed outdoor, the area is called "femtocell". Hereinafter, a base station forming a femtocell is called "femto base station".

Femto base stations as well as base stations in existing mobile communication networks transmit a common pilot signal. A mobile station performs synchronization establishment, channel estimation, and the like by receiving a common pilot signal, and thereby performs data transmission/reception with a base station. Therefore, it is necessary to be able to receive a common pilot signal with good receiving quality in a mobile station in order to provide good communication quality.

In base stations in existing mobile communication networks, the transmission power of a common pilot signal to be transmitted in each cell is set to a fixed value. In contrast to this, as for common pilot signals transmitted by femto base stations in femtocells, a way of autonomously setting the transmission power by a femto base station has been studied. Patent document 1 (page 14, line 8 to page 15, line 21) discloses such a method.

A specific example of a transmission power setting method for a femto base station disclosed in Patent document 1 is explained hereinafter with reference to FIG. 32. In FIG. 32, a macro base station 811 forms a macrocell 801 and transmits a common pilot signal CP1 with a constant transmission power to communicate with a mobile station (not shown). Femto base stations 812A and 812B form femtocells 802A and 802B respectively to communicate with a mobile station(s) (not shown). Further, each of the femto base stations 812A and 812B measures a received power Pmacro [dBm] of the common pilot signal CP1 of the macro base station 811, and they transmit common pilot signals CP2A and CP2B respectively with a transmission power Pmacro+Poffset [dBm] by using the same radio frequency band as that of the macro base station 811. Note that Poffset is a power offset, and is a constant value common to all the femtocells 802A and 802B.

The femto base station like the one described above has been studied for use in systems such as W-CDMA (Wideband Code Division Multiple Access) and E-UTRAN (also called "LTE: Long Term Evolution"). In W-CDMA, data transmission is performed by using a dedicated channel, of which transmission power is controlled, on the uplink and the downlink, or is performed by using a shared channel on the downlink as described in 3GPP TS 25.214 V7.3.0. Further, in E-UTRAN, a radio frequency band is divided into a plurality of PRBs (Physical Resource Blocks) as described in 3GPP TS 36.300 V8.1.0. Specifically, a scheduler provided in an E-UT-RAN base station assigns PRBs, and a base station performs data transmission with a mobile station by using an assigned PRB.

[Patent Document 1]
UK Patent Application Publication No. 2428937 A

DISCLOSURE OF INVENTION

Technical Problem

As described above, in Patent document 1, the transmission power of a common pilot signal of a femto base station is determined by adding a fixed power offset Poffset to the reception level Pmacro of a common pilot signal of a macro base station. However, the method for determining the transmission power of a common pilot signal of a femto base station disclosed in Patent document 1 does not give sufficient consideration to the fact that femto base stations are often installed in locations, such as inside buildings, where the femto base stations are isolated from mobile stations located outdoors that communicate with macro base stations from the viewpoint of the propagation loss of the radio signal. Therefore, the method disclosed in Patent document 1 has the following problem.

A problem that occurs when femto base stations 812A and 812B shown in FIG. 32 are located inside a building A or B as shown in FIGS. 33(a) and 33(b) is analyzed. In FIG. 33(a), a mobile station 91A can connect to and communicate with the femto base station 812A. Similarly, in FIG. 33(b), a mobile station 91B can connect to and communicate with the femto base station 812B.

The femto base station 812A shown in FIG. 33(a) is located near a window of the building 90A. Meanwhile, the mobile station 91A shown in FIG. 33(a) is located relatively near the center of the room of the building 90A in comparison to the femto base station 812A. Further, the femto base station 812B shown in FIG. 33(b) is located near the center of the room of the building 90B. Meanwhile, the mobile station 91B shown in FIG. 33(b) is located relatively near a window of the building 90B in comparison to the femto base station 812B.

A common pilot signal CP1 transmitted from a macro base station 811 located outside the buildings 90A and 90B attenuates when it passes through the buildings 90A and 90B and reaches inside the buildings 90A and 90B. In the following explanation, the level difference between a received power level of a radio signal in a place outside a building and a received power level of the radio signal in a place inside the building is defined as "Building penetration loss".

In FIGS. 33(a) and 33(b), a building penetration loss $LP_A$ at the installation place of the femto base station 812A and a building penetration loss $LP_B$ at the installation place of the femto base station 812B are different from each other. Therefore, the received power PA of a common pilot signal CP1 by the femto base station 812A located near the window is larger compared to the received power PB of a common pilot signal CP1 by the femto base station 812B located near the room center. An assumption is made in this example that the power of a common pilot signal CP1 that reaches outside the building 90A is equal to the power of a common pilot signal CP1 that reaches outside the building 90B. Further, it is also assumed that the penetration loss that is caused when a common pilot signal CP1 passes through the building 90A is equal to the penetration loss that is caused when a common pilot signal CP1 passes through the building 90B.

In this situation, assume a case where a power offset Poffset is determined in accordance with the method for setting the transmission power of a femto base station disclosed in the above-described Patent document 1 so that the femto base station 812A can provide good communication quality throughout the entire space inside the building 90A. When Poffset that is determined in this manner is applied to the femto base stations 812A and 812B, the transmission power of a common pilot signal CP2B transmitted by the femto base station 812B becomes smaller, thus raising a possibility that good communication quality could not be provided throughout the entire space inside the building 90B.

Therefore, assume a case where the power offset Poffset is determined so that the femto base station 812B, instead of the femto base station 812A, can provide good communication quality throughout the entire space inside the building 90B and then Poffset is applied to the femto base stations 812A and 812B. In this case, since the transmission power of a common pilot signal CP2A transmitted by the femto base station 812A becomes larger, good communication quality can be provided throughout the entire space inside the building 90A. However, since the transmission power of the common pilot signal CP2A is so large that the common pilot signal CP2A could interfere significantly with a mobile station 91C that is located outside the building 90A and connects to and communicates with the macro base station 811.

Note that the radio parameter that affects the magnitude of interference on the downlink signal or the uplink signal of the mobile station 91C that connects to and communicates with the macro base station 811 is not limited to the above-described transmission power of a common pilot signal by a femto base station. That is, any radio parameter that affects the magnitude of the transmission power of a femto base station or the transmission power of a mobile station that connects to and communicates with the femto base station could affects the level of interference on the uplink signal or the downlink signal between the macro base station 811 and the mobile station 91C. Examples of the radio parameters like this includes a maximum value of the total transmission power of a femto base station, a target value of the total received power RTWP (Received Total Wideband Power) from a mobile station in a femto base station, a maximum value of transmission power density of a femto base station, a maximum value of the total transmission power of a mobile station, and a maximum value of transmission power density of a mobile station.

Note that the occurrence of the above-described interference problem is not limited to the cases where a femto base station is used. For example, it could be also problematic in radio ad-hoc networks in which radio stations autonomously form a network. That is, the above-described interference problem could commonly occur, in a situation where two radio stations are communicating, when another radio station performs communication in the vicinity of their communication site (e.g., in the outside or in another room separated by a wall).

The present invention has been made based on the above-described findings, and an object of the present invention is to provide a radio station apparatus capable of providing good communication quality inside a building while suppressing interference on communication of other radio stations caused by radio waves leaked outside the building, a radio resource control method, a radio station control program, and a radio communication system.

Technical Solution

A first aspect of the present invention includes a radio station apparatus that performs radio communication with at least one opposed radio station. The radio station apparatus includes a radio resource control unit that obtains measured values of a reception quality level of an external radio signal that is obtained by at least one of the radio station apparatus and the at least one opposed radio station by measuring the reception quality level, and determines a radio parameter relating to radio communication between the radio station apparatus and the at least one opposed radio station based on a relative comparison between the measured values of the reception quality level. Note that the external radio signal is a radio signal transmitted from an external radio station that is different from any of the radio station apparatus and the at least one opposed radio station.

Further, a second aspect of the present invention includes a radio resource control method. The method includes following steps (a) and (b). In the step (a), at least one of a first radio station and at least one second radio station capable of communicating with the first radio station measures a reception quality level of an external radio signal transmitted from an external radio station that is different from any of the first and second radio stations. In the step (b), a radio parameter relating to radio communication between the first radio station and the at least one second radio station is determined based on a relative comparison between measured values of the reception quality level measured in the step (a).

Advantageous Effects

The difference among the reception quality levels that are obtained by multiple measurements reflects the difference in the propagation loss of the external radio signal due to the measurement place of a radio station performing the measurement (in the case of indoor measurement, difference in building penetration loss). Therefore, by performing a relative comparison(s) among the reception quality levels obtained by multiple measurements, it is possible to surmise in what kind of place in the building the first radio station is located.

Therefore, according to a radio station apparatus in accordance with the first aspect of the present invention, a radio parameter relating to radio communication between the radio station apparatus and the opposed radio station can be adjusted while taking the difference in building penetration loss due to the difference of installation place inside the building within which the radio station apparatus is located into consideration. The same holds true for a radio resource control method in accordance with the second aspect of the present invention. Therefore, the radio station apparatus in accordance with the first aspect of the present invention as well as the radio resource control method in accordance with the second aspect of the present invention can provide good communication quality inside a building while suppressing interference exerted on communication of other radio stations by radio waves leaked outside the building.

BRIEF DESCRIPTION OF DRAWINGS

FIG. 33 shows a disposition of a femto base station for explaining a problem to be solved.

EXPLANATION OF REFERENCE 1, 2, 3, 4 FEMTO BASE STATION
5 FEMTOCELL
6-1 TO 6-3 MOBILE STATION
7 FEMTO GATEWAY APPARATUS
8 UPPER NETWORK
10 ANTENNA
11 RADIO TRANSMISSION/RECEPTION UNIT
12 RECEPTION DATA PROCESSING UNIT
13 TRANSMISSION DATA PROCESSING UNIT
14 WIRED TRANSMISSION/RECEPTION UNIT
15, 25, 35, 45 RADIO RESOURCE CONTROL UNIT
16 EXTERNAL RADIO SIGNAL RECEPTION UNIT
37 REGISTERED MOBILE STATION ACCEPTANCE UNIT
151 RADIO NETWORK CONTROL UNIT
152 RADIO NETWORK CONTROL DATA SETTING UNIT
161 MOBILE STATION MODE RECEPTION UNIT
S1 EXTERNAL RADIO SIGNAL

BEST MODE FOR CARRYING OUT THE INVENTION

Specific exemplary embodiments to which the present invention is applied are explained hereinafter in detail with reference to the drawings. The same components are denoted by the same signs throughout the drawings, and duplicated explanation is omitted as appropriate for simplifying the explanation.

First Exemplary Embodiment of the Invention

Figure 1:
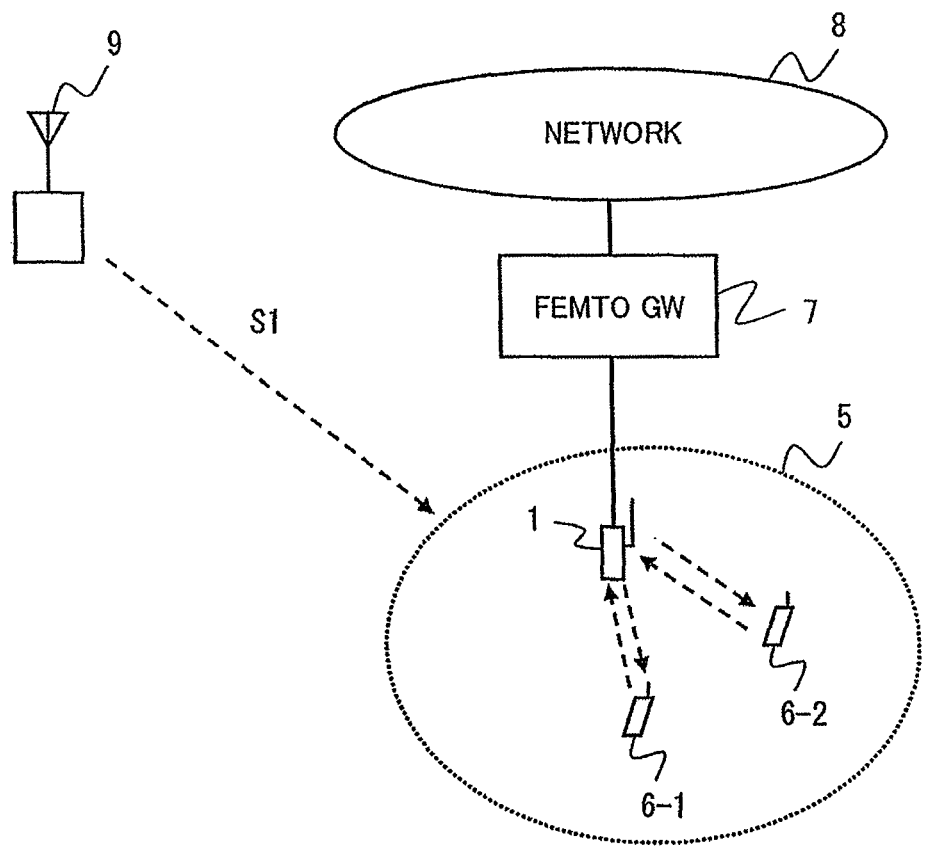
FIG. 1 is a configuration diagram of a radio communication system including a femto base station in accordance with a first exemplary embodiment of the present invention.

FIG. 1 is a configuration example of a radio communication system including a femto base station 1 in accordance with this exemplary embodiment. The following explanation is made on the assumption that the radio communication system in accordance with this exemplary embodiment is a radio communication system adopting an FDD (Frequency division Dupulex)-CDMA mode, more specifically a W-CDMA mode.

In FIG. 1, the femto base station 1 forms a femtocell 5. The size of the femtocell 5 is defined by the range within which a common pilot signal (CPICH: Common Pilot Channel) transmitted by the femto base station 1 can be received.

Mobile stations 6-1 and 6-2 connect to and communicate with the femto base station 1 in the femtocell 5.

A femto gateway apparatus 7 is connected to the femto base station 1, and also connected to an upper network 8. The femto gateway apparatus 7 controls communication and performs information transmission between the upper network 8 and the mobile stations 6-1 and 6-2 located within the subordinate femtocell 5 formed by the femto base station 1.

An external radio station 9, which is a radio station installed outside the building within which the femto base station 1 is installed, transmits an external radio signal S1. An example of the external radio station 9 is a macro base station that forms a macrocell covering the femtocell 5 in a higher layer. When a macro base station is used as the external radio station 9, a CPICH transmitted by the macro base station (hereinafter called "macro CPICH") may be used as the external radio signal S1. Further, another example of the external radio station 9 is a GPS (Global Positioning System) satellite. When a GPS satellite is used as the external radio station 9, a GPS signal transmitted by the GPS satellite may be used as the external radio signal S1.

The femto base station 1 in accordance with this exemplary embodiment has a radio parameter adjustment function in order to provide good communication quality inside a building while suppressing interference exerted on communication of other radio stations by radio waves leaked from the femto base station 1 and mobile stations 6-1 and 6-2 to outside the building. Note that the radio parameter is a parameter(s) relating to a radio resource(s) used in communication between the femto base station 1 and the mobile stations 6-1 and 6-2. To adjust this radio parameter, the femto base station 1 performs a relative comparison between a plurality of reception quality levels that are obtained by the femto base station 1 and the mobile stations 6-1 and 6-2 by receiving the external radio signal S1. Details of the procedure for determining a radio parameter performed by the femto base station 1 are explained later.

Note that, needless to say, FIG. 1 shows only a few components for the sake of explanation of the present invention. For example, the radio communication system in accordance with this exemplary embodiment may include other femto base stations and mobile stations in addition to those shown in FIG. 1, and may also include a macrocell in a higher layer that is formed so as to cover the femtocell 5 and a macro base station forming this macrocell.

Figure 2:
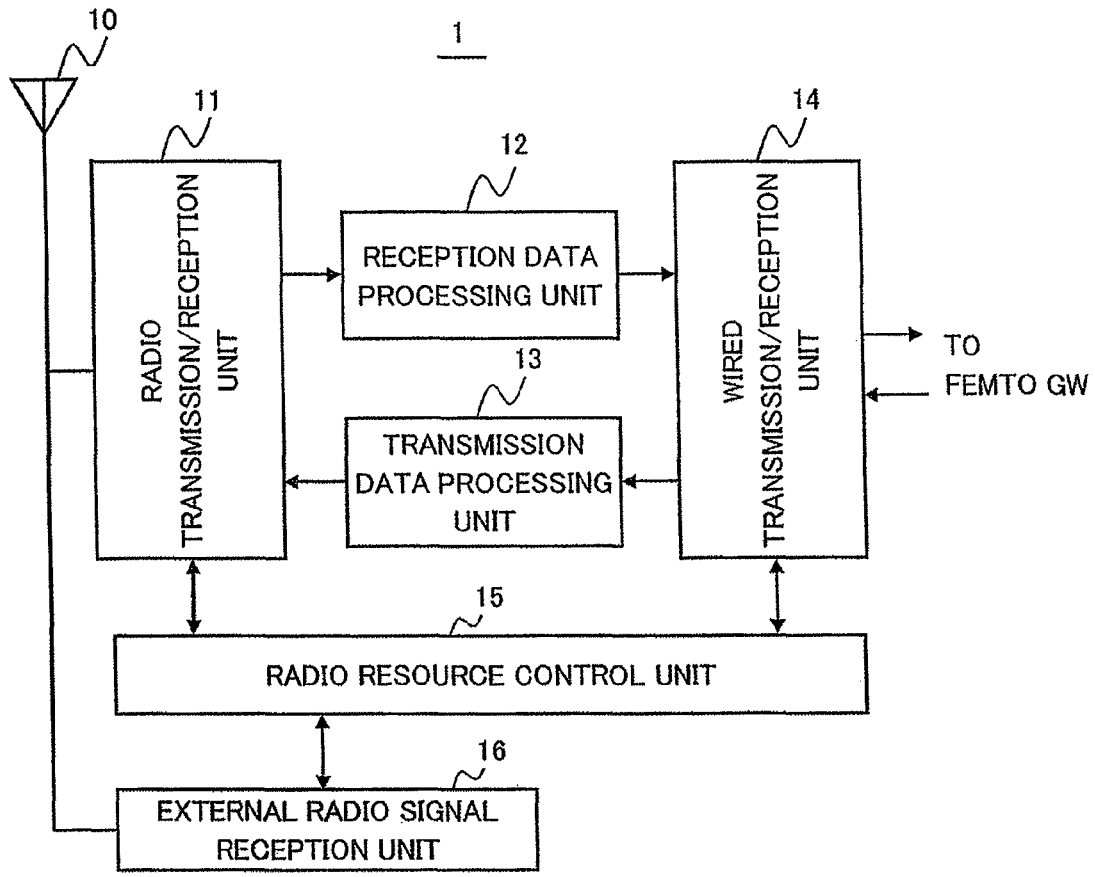
FIG. 2 is a block diagram of a femto base station in accordance with a first exemplary embodiment of the present invention.

Next, a configuration example of the femto base station 1 and a specific example of a radio parameter determination procedure are explained hereinafter in detail. FIG. 2 is a block diagram showing a configuration of a femto base station 1.

A radio transmission/reception unit 11 receives an uplink signal transmitted from the mobile stations 6-1 and 6-2 through an antenna 10, and outputs a downlink signal to be transmitted to the mobile stations 6-1 and 6-2 to the antenna 10.

A reception data processing unit 12 performs demodulation processing on an uplink channel signal received by the radio transmission/reception unit 11, and supplies the obtained uplink data to a wired transmission/reception unit 14. A transmission data processing unit 13 receives downlink data to be transmitted from the wired transmission/reception unit 14 to the mobile station, performs processing including error correction encoding and interleaving, and then supplies the processed downlink data to the radio transmission/reception unit 11.

The wired transmission/reception unit 14 functions as an interface that transmits/receives uplink/downlink data to/from the femto gateway apparatus 7.

A radio resource control unit 15 supplies a radio parameter(s) relating to a radio resource(s), which is used when the radio transmission/reception unit 11 transmits/receives a radio signal, to the radio transmission/reception unit 11. At least one parameter that affects the magnitude of the transmission power of the femto base station 1 or the magnitude of the transmission power of the mobile stations 6-1 and 6-2 is included in a plurality of radio parameters that are designated by the radio resource control unit 15. Specific examples of the radio parameter that affects the magnitude of the transmission power of the femto base station 1 include a transmission power P_tx of a common pilot signal CPICH, a maximum value of the total transmission power of the femto base station 1, and a maximum value of transmission power density of the femto base station 1. Meanwhile, specific examples of the radio parameter that affects the magnitude of the transmission power of the mobile stations 6-1 and 6-2 include a target value RTWP_target of the total uplink received power (Received Total Wideband Power) of the femto base station 1, a target value of an Ec/No (Received Energy per chip/power density), a target value of an SIR (Signal to Interference ratio), a maximum value of the total transmission power of the mobile station, and a maximum value of transmission power density of the mobile station.

An external radio signal reception unit 16 receives the external radio signal S1 and measures a reception quality level of the external radio signal S1. The reception quality to be measured may be any physical quantity that varies according to the attenuation of the external radio signal S1. For example, when the external radio signal S1 is a macro CPICH, the external radio signal reception unit 16 may measure an RSCP (Received Signal Code Power), an Ec/No, an SIR, or the like of the macro CPICH as reception quality. Further, when the external radio signal S1 is a GPS signal, the external radio signal reception unit 16 may measure a received power of the GPS signal, a time required to obtain position information with predetermined reliability, an error in the obtained position information, or the like as reception quality.

Next, a specific example of a procedure for determining a radio parameter performed by the femto base station 1 is explained. In this example, a case where a CPICH transmission power P_tx of the femto base station 1 and a target value RTWP_target of the total uplink received power that the femto base station 1 receives from the mobile station are adjusted is explained in a concrete manner.

Figure 3:
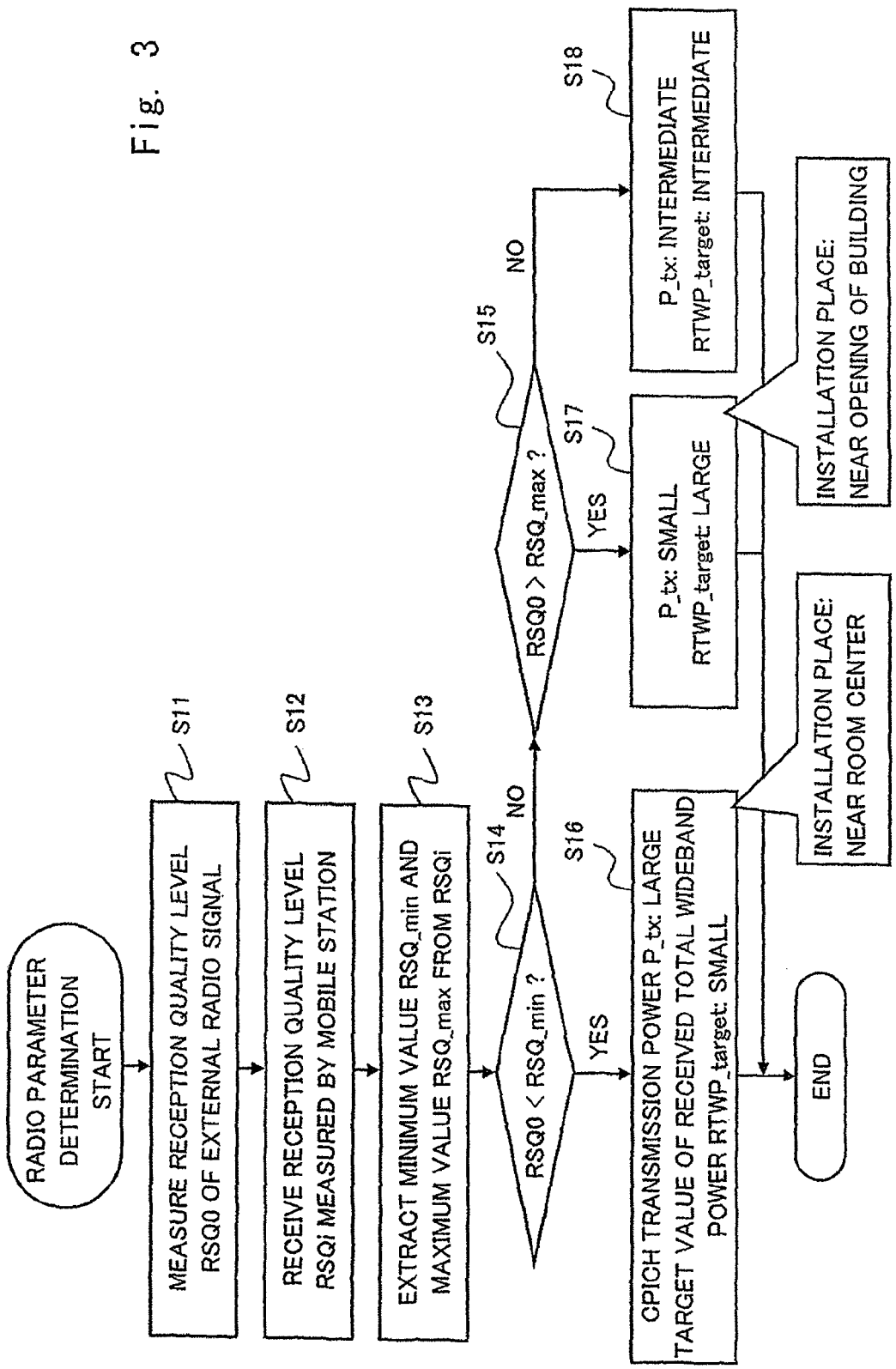
FIG. 3 is a flowchart showing a radio parameter adjustment procedure performed by a femto base station in accordance with a first exemplary embodiment of the present invention.

FIG. 3 is a flowchart showing a radio parameter adjustment procedure performed by the femto base station 1. In a step S11, the external radio signal reception unit 16 measures a reception quality level of the external radio signal S1. In the following explanation, a reception quality level of the external radio signal S1 measured by the external radio signal reception unit 16 is referred to as "RSQ0". The reception quality level RSQ0 may be a result of a single measurement, or may be a median value, an average value, or a given percent value obtained from results of multiple measurements.

In a step S12, the radio resource control unit 15 receives a reception quality level of the external radio signal S1 measured by the mobile stations 6-1 and 6-2 through the antenna 10 and the radio transmission/reception unit 11. In the following explanation, a reception quality level of the external radio signal S1 measured by the mobile stations 6-1 and 6-2 is referred to as "RSQi" (i is an integer equal to or greater than one). Note that in order to adjust a radio parameter with accuracy, the number of the reception quality level RSQi is preferably more than one. However, the only requirement is that the reception quality level RSQi should be measured at least once. Note that to obtain a plurality of reception quality levels RSQi, at least one of the mobile stations 6-1 and 6-2 may perform multiple measurements. The trigger at which the mobile stations 6-1 and 6-2 report the reception quality level RSQi to the femto base station 1 may be determined in the following manner. For example, the femto base station 1 may instruct the mobile stations 6-1 and 6-2 to report a reception quality level RSQi at predetermined regular intervals so that the mobile stations 6-1 and 6-2 report it at regular intervals. As another example, the mobile stations 6-1 and 6-2 may report a reception quality level RSQi by using a call-in from the femto base station 1 to the mobile stations 6-1 and 6-2 as a trigger.

In a step S13, the radio resource control unit 15 extracts a minimum value RSQ_min and a maximum value RSQ_max from among RSQi received in the step S12. Note that the minimum value RSQ_min and the maximum value RSQ_max extracted in this process may be any substantial minimum value and maximum value respectively. For example, the minimum value RSQ_min and the maximum value RSQ_max may be obtained after eliminating inappropriate RSQi values that might have been caused by an incorrect measurement or an unexpected disturbance.

In steps S14 and S15, the minimum value RSQ_min and the maximum value RSQ_max are compared in magnitude with RSQ0. Then, when RSQ0 is smaller than the minimum value RSQ_min (Yes in step S14), the radio resource control unit 15 relatively increases the CPICH transmission power P_tx of the femto base station 1 and relatively decreases the target value RTWP_target of the total received power of the uplink signal received from the mobile station (step S16).

When RSQ0 is smaller than the minimum value RSQ_min, it is presumed that the femto base station 1 is located near the room center of the building 90, i.e., in a place from which the radio wave leakage to the outside less likely occurs as shown in FIG. 4(a). In contrast to this, the mobile stations 6-1 and 6-2 are presumed to be located near an opening of the building such as a window from which the radio wave leakage to the outside tends to occur. Therefore, in the step S16, the radio parameter is determined so that the transmission power of the femto base station 1 is relatively increased and the transmission power of the mobile stations 6-1 and 6-2 is relatively decreased. As described above, the CPICH transmission power P_tx is a radio parameter used to adjust the transmission power of the femto base station 1. Meanwhile, RTWP_target is a radio parameter used to adjust the transmission power of the mobile stations 6-1 and 6-2.

In contrast, when RSQ0 is greater than the maximum value RSQ_max (Yes in step S15), the radio resource control unit 15 relatively decreases P_tx and relatively increases the RTWP_target (step S17). This is because, when RSQ0 is greater than the maximum value RSQ_max, it is presumed that the femto base station 1 is located near an opening of the building and that the mobile stations 6-1 and 6-2 are located near the room center as shown in FIG. 4(b).

Further, when the magnitude of RSQ0 is between the minimum value RSQ_min and the maximum value RSQ_max (No in step S15), the radio resource control unit 15 determines P_tx and RTWP_target to an intermediate value between the set value in the step S16 and the set value in the step S17 (step S18). When the magnitude of RSQ0 is between the minimum value RSQ_min and the maximum value RSQ_max, it is presumed, as shown in FIG. 4(c), that the disposition of the femto base station 1 and the mobile stations 6-1 and 6-2 is an intermediate disposition between that in FIG. 4(a) and that in FIG. 4(b).

Note that in the flowchart shown in FIG. 3, an example where the minimum value RSQ_min and the maximum value RSQ_max are extracted and compared with RSQ0 is shown. However, any reference values other than the minimum value RSQ_min and the maximum value RSQ_max may be also used as the RSQi value to be compared with RSQ0. For example, instead of the minimum value RSQ_min, a value obtained by adding a margin of a certain ratio to the minimum value RSQ_min as well as a second smallest value among a plurality of RSQi may be used.

As described above, a femto base station 1 in accordance with this exemplary embodiment can estimate a relative positional relation of the femto base station 1 and mobile stations 6-1 and 6-2 inside a building by performing a relative comparison between the reception quality level of the external radio signal S1 measured by the femto base station 1 and the reception quality level of the external radio signal S1 measured by the mobile stations 6-1 and 6-2. Further, the femto base station 1 can provide, by using this estimation result, good communication quality inside a building while suppressing interference exerted on communication of other radio stations by radio waves leaked outside the building in order to adjust the transmission powers of the femto base station 1 and the mobile stations 6-1 and 6-2.

Further, since the femto base station 1 can estimate a relative positional relation between the femto base station 1 and the mobile stations 6-1 and 6-2 inside the building, the femto base station 1 can perform reciprocal radio resource control such that the transmission power of a radio station located in a place from which interference on other radio stations located outside the building is small (e.g., femto base station 1) is increased while the transmission power of a radio station located in a place from which interference on other radio stations located outside the building is large (e.g., mobile stations 6-1 and 6-2) is decreased.

Specific Example in a Case where External Radio Station 9 is Macro Base Station

Next, a specific configuration example of a femto base station 1 corresponding to a case where the external radio station 9 is a macro base station as well as five specific examples of the radio parameter adjustment procedure are explained hereinafter in detail.

Figure 5:
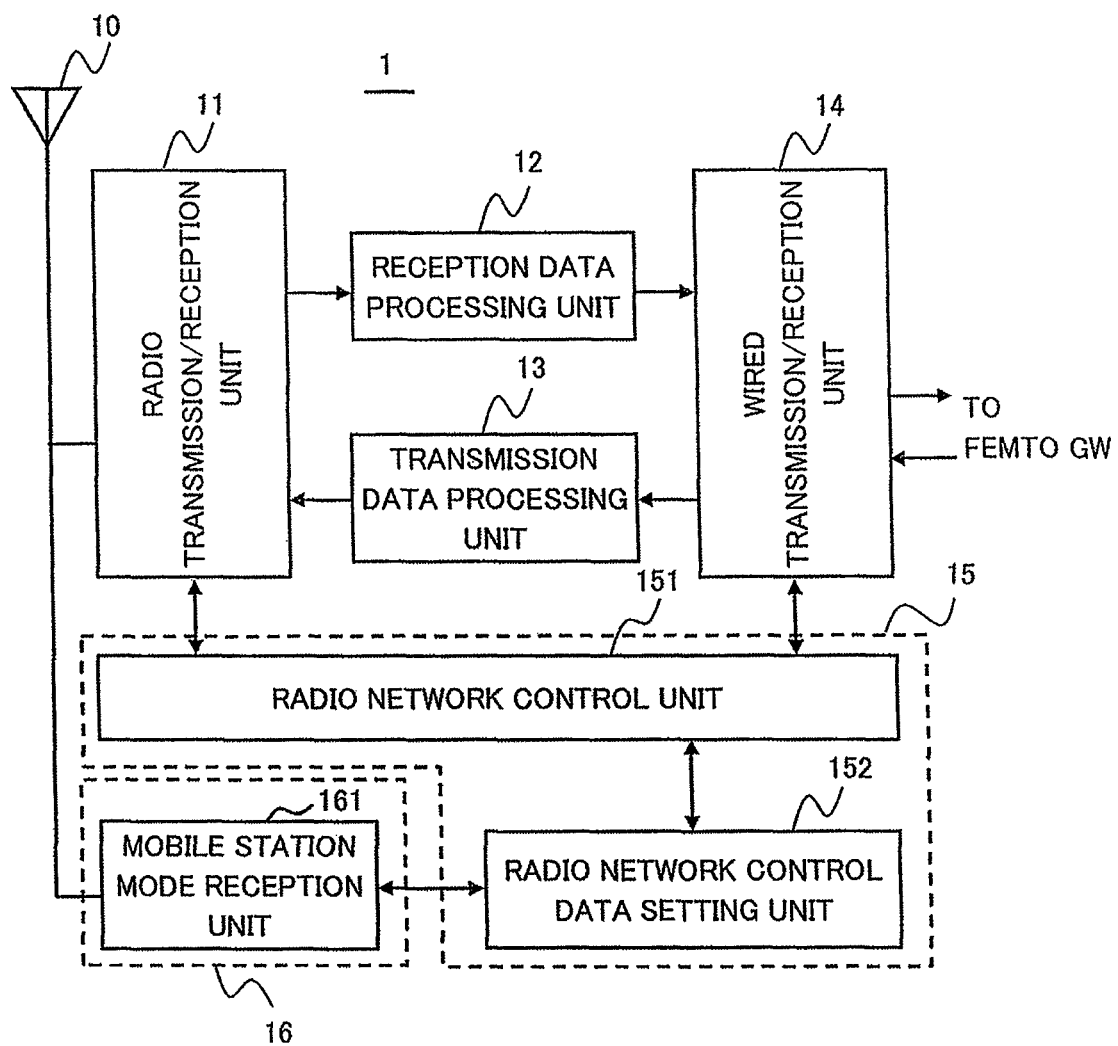
FIG. 5 is a block diagram showing a specific example of a femto base station in accordance with a first exemplary embodiment of the present invention.

FIG. 5 is a block diagram showing a configuration example of a femto base station 1 equipped with a macro CPICH receiving function. The femto base station 1 shown in FIG. 5 includes a radio network control unit 151 and a radio network control data setting unit 152 as the radio resource control unit 15. Further, the femto base station 1 in FIG. 5 includes a mobile station mode reception unit 161 as the external radio signal reception unit 16.

The radio network control unit 151, which has a function as a radio network controller (hereinafter called "RNC"), supplies radio parameters such as a used frequency band, a CPICH transmission power P_tx, a maximum value of the total transmission power of all the downlink channels, and a target value RTWP_target of the total uplink received power to the radio transmission/reception unit 11. Note that in the configuration example shown in FIG. 5, the CPICH transmission power P_tx and the target value RTWP_target of the total uplink received power are determined by the radio network control data setting unit 152, which is described later.

The mobile station mode reception unit 161 measures an RSCP (Received Signal Code Power) of a macro CPICH that is transmitted from a macro base station forming a macrocell (not shown) overlaid over the femtocell 5, i.e., from the external radio station 9 through the antenna 10. In the following explanation, a measured value of an RSCP of a macro CPICH by the mobile station mode reception unit 161 is referred to as "RSCP0". That is, RSCP0 is a specific example of the above-described reception quality level RSQ0.

The radio network control data setting unit 152 receives a notification of RSCP0 measured by the mobile station mode reception unit 161. Further, the radio network control data setting unit 152 receives an RSCP of a macro CPICH (hereinafter called "RSCPi") measured by the mobile stations 6-1 and 6-2. That is, RSCPi is a specific example of the reception quality level RSQi measured by a mobile station.

The radio network control data setting unit 152 determines the values of P_tx and RTWP_target according to the locations of the femto base station 1 and the mobile stations 6-1 and 6-2 inside the building by performing a relative comparison between RSCP0 and RSCPi. For example, the radio network control data setting unit 152 may determine P_tx and RTWP_target by using the following equations (1) to (3).

$$P\_tx = RSCP0 + P\_tx\_offset \quad (1)$$

$$P\_tx\_offset = P\_tx\_offset\_default + P\_tx\_offset\_delta \quad (2)$$

$$RTWP\_target = RTWP\_target\_default + RTWP\_target\_delta \quad (3)$$

In the equations, P_tx_offset is a power offset value used to determine the CPICH transmission power P_tx. P_tx_offset_default is a predefined reference value for P_tx_offset. Further, RTWP_target_default is a predefined reference value for RTWP_target. Meanwhile, P_tx_offset_delta and RTWP_target_delta are determined as a function of the minimum value RSCP_min and maximum value RSCP_max of RSCPi.

Figure 6:
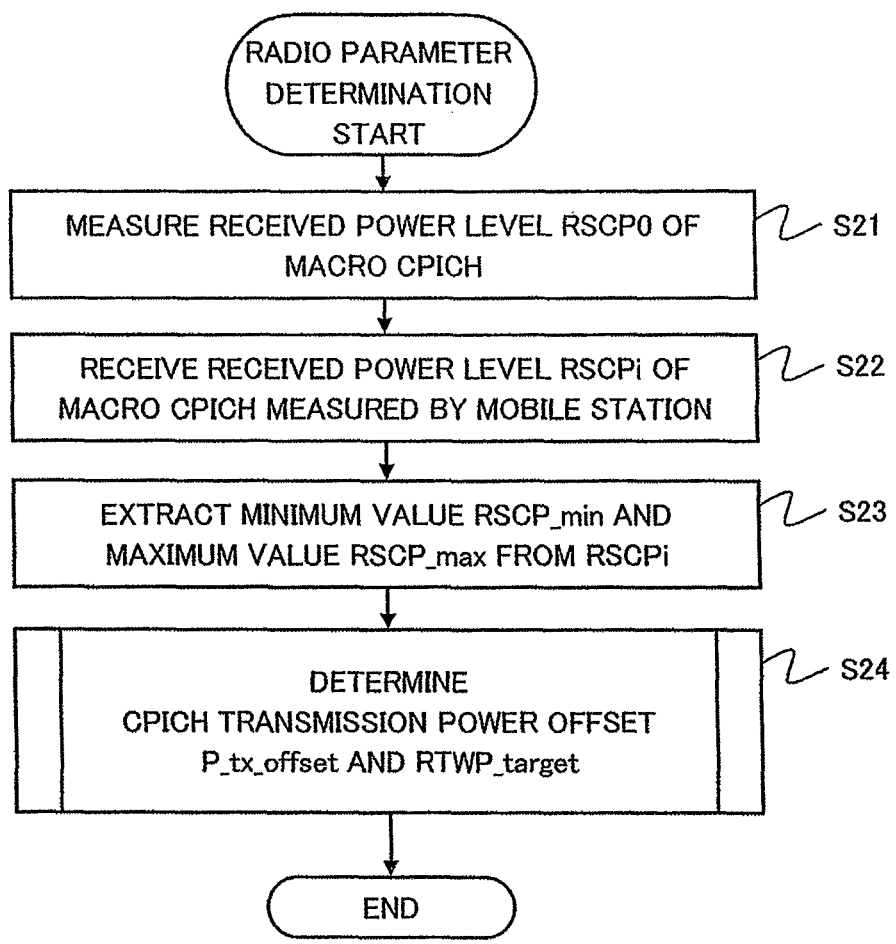
FIG. 6 is a flowchart showing a specific example of a radio parameter adjustment procedure performed by a femto base station in accordance with a first exemplary embodiment of the present invention.

FIG. 6 is a flowchart showing an overall procedure for determining P_tx_offset and RTWP_target performed by the femto base station 1. In a step S21, the mobile station mode reception unit 161 measures a received power level RSCP0 of a macro CPICH. In a step S22, the radio network control data setting unit 152 receives RSCPi measured by the mobile stations 6-1 and 6-2. In a step S23, the radio network control data setting unit 152 extracts a minimum value RSCP_min and a maximum value RSCP_max from among the received RSCPi. In a step S24, the radio network control data setting unit 152 determines P_tx_offset and RTWP_target as a function of the minimum value RSCP_min and maximum value RSCP_max. The CPICH transmission power P_tx is determined by applying a calculation result of P_tx_offset to the above-described equation (1). Hereinafter, five specific examples of the procedure for adjusting P_tx_offset and RTWP_target are introduced.

First Specific Example

Figure 7:
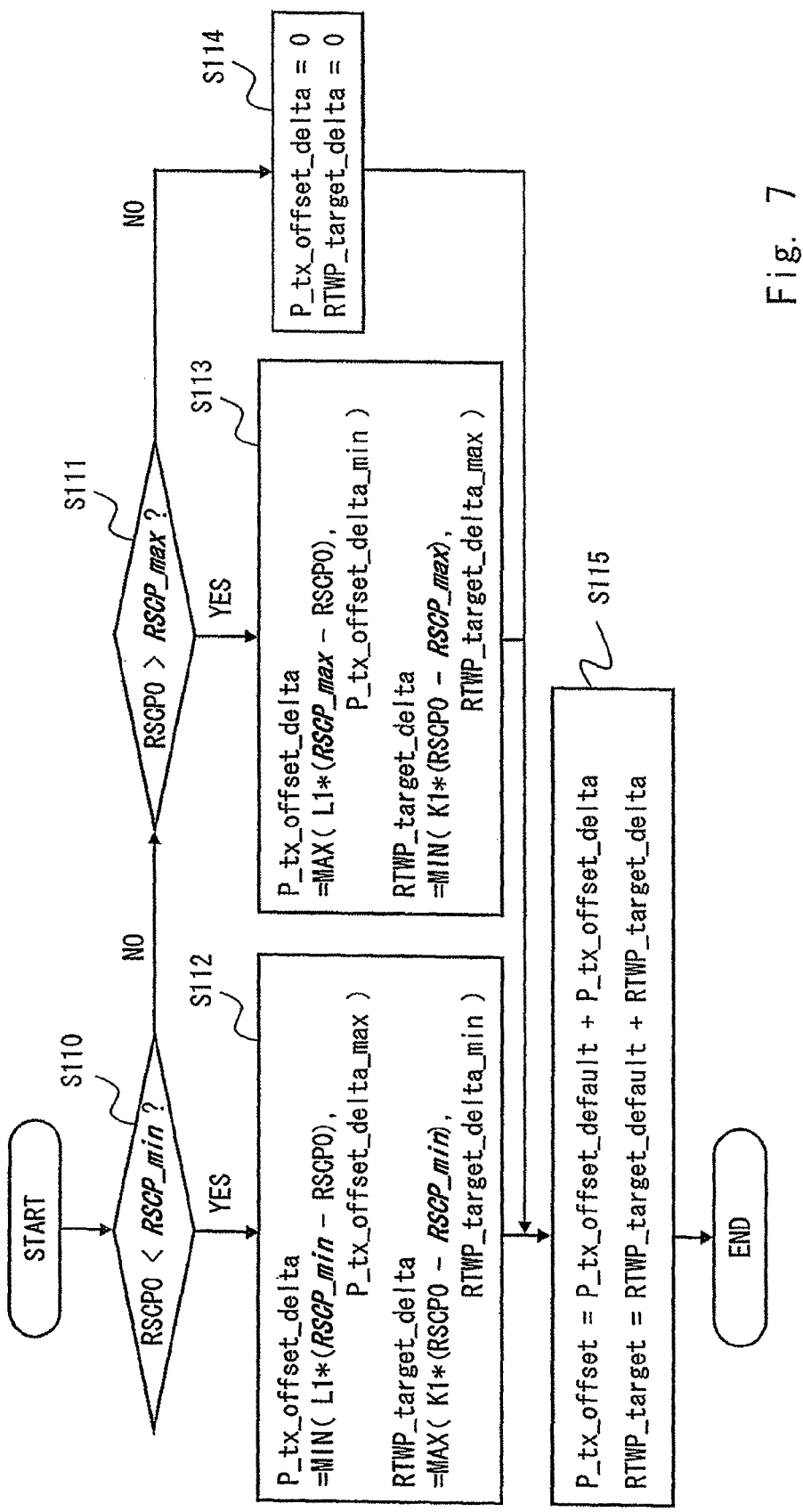
FIG. 7 is a flowchart showing a first specific example of a procedure for adjusting a CPICH transmission power offset and an RTWP target value.

FIG. 7 is a flowchart showing a first specific example of a procedure for adjusting P_tx_offset and RTWP_target. In steps S110 and S111, RSCP_min and RSCP_max are compared in magnitude with RSCP0.

When RSCP0 is determined to be smaller than the minimum value RSCP_min (Yes in step S110), the radio network control data setting unit 152 calculates P_tx_offset_delta and RTWP_target_delta by using the following equations (4) and (5) (step S112).

$$P\_tx\_offset\_delta = MIN(L1*(RSCP\_min - RSCP0), P\_tx\_offset\_delta\_max) \quad (4)$$

$$RTWP\_target\_delta = MAX(K1*(RSCP0 - RSCP\_min), RTWP\_target\_delta\_min) \quad (5)$$

In the equations, L1 and K1 are a positive constant. P_tx_offset_delta_max is a value that is predefined as an upper-limit value of P_tx_offset_delta. RTWP_target_delta_min is a value that is predefined as a lower-limit value of RTWP_target_delta. Further, the function MIN( ) is a function to obtain a minimum value from among a plurality of values designated as the arguments. Furthermore, the function MAX( ) is a function to obtain a maximum value from among a plurality of values designated as the arguments.

The step S112 corresponds to the step S16 of FIG. 3. That is, by calculating P_tx_offset_delta and RTWP_target_delta in accordance with the equations (4) and (5), the CPICH transmission power P_tx of the femto base station 1 can be relatively increased while the target value RTWP_target of the total uplink received power can be relatively decreased.

In contrast, when RSCP0 is determined to be greater than the maximum value RSCP_max (Yes in step S111), the radio network control data setting unit 152 calculates P_tx_offset_delta and RTWP_target_delta by using the following equations (6) and (7) (step S113).

$$P\_tx\_offset\_delta = MAX(L1*(RSCP\_max - RSCP0), P\_tx\_offset\_delta\_min) \quad (6)$$

$$RTWP\_target\_delta = MIN(K1*(RSCP0 - RSCP\_max), RTWP\_target\_delta\_max) \quad (7)$$

In the equations, P_tx_offset_delta_min is a value that is predefined as a lower-limit value of P_tx_offset_delta. RTWP_target_delta_max is a value that is predefined as an upper-limit value of RTWP_target_delta.

The step S113 corresponds to the step S17 of FIG. 3. That is, by calculating P_tx_offset_delta and RTWP_target_delta in accordance with the equations (6) and (7), P_tx of the femto base station 1 can be relatively decreased while RTWP_target can be relatively increased.

Further, when the magnitude of RSCP0 is between the minimum value RSCP_min and the maximum value RSCP_max (No in step S111), the radio network control data setting unit 152 calculates P_tx_offset_delta and RTWP_target_delta by using the following equations (8) and (9) (step S114).

$$P\_tx\_offset\_delta = 0 \quad (8)$$

$$RTWP\_target\_delta = 0 \quad (9)$$

The step S114 corresponds to the step S18 of FIG. 3. That is, by calculating P_tx_offset_delta and RTWP_target_delta in accordance with the equations (8) and (9), the magnitude of P_tx and RTWP_target can be determined to an intermediate value between the value determined in the step S112 and the value determined in the step S113.

In a step S115, by using P_tx_offset_delta and RTWP_target_delta determined by one of the steps S112 to S114, P_tx_offset and RTWP_target are calculated by using the above-described equations (2) and (3).

Figure 8:
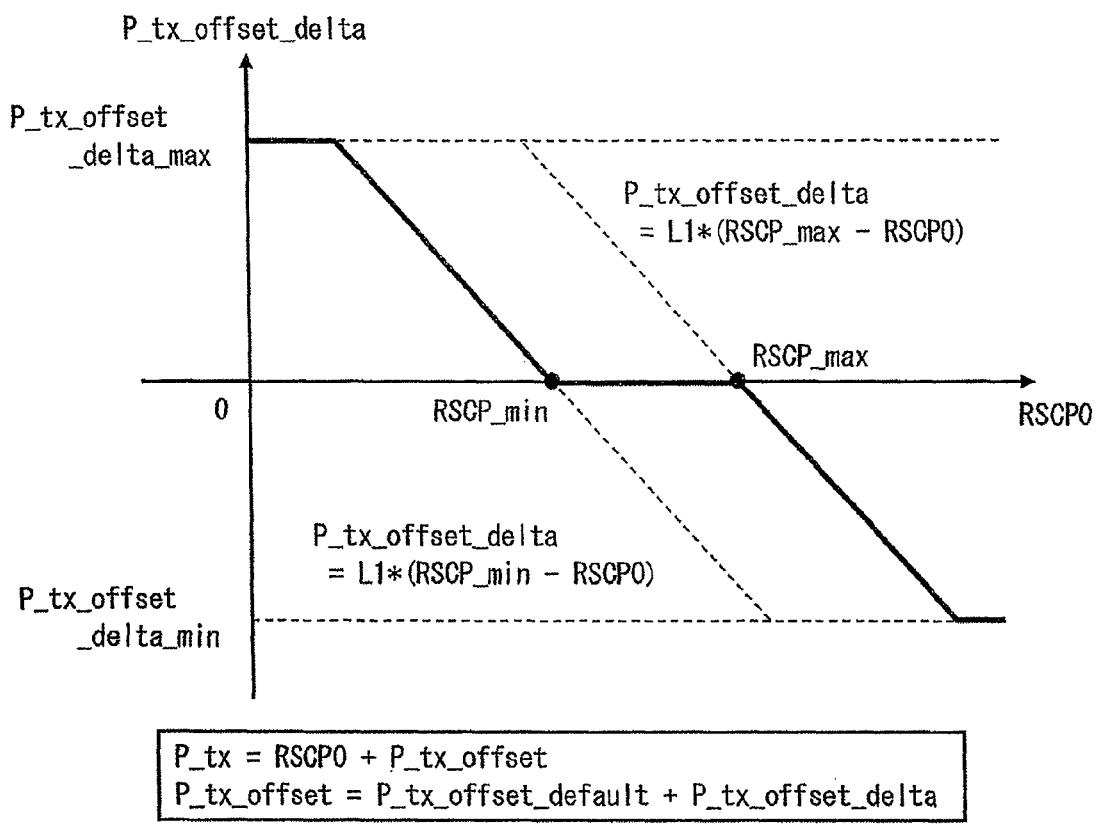
FIG. 8 is a graph for explaining a procedure for adjusting a CPICH transmission power offset in accordance with a first specific example shown in FIG. 7.
Figure 9:
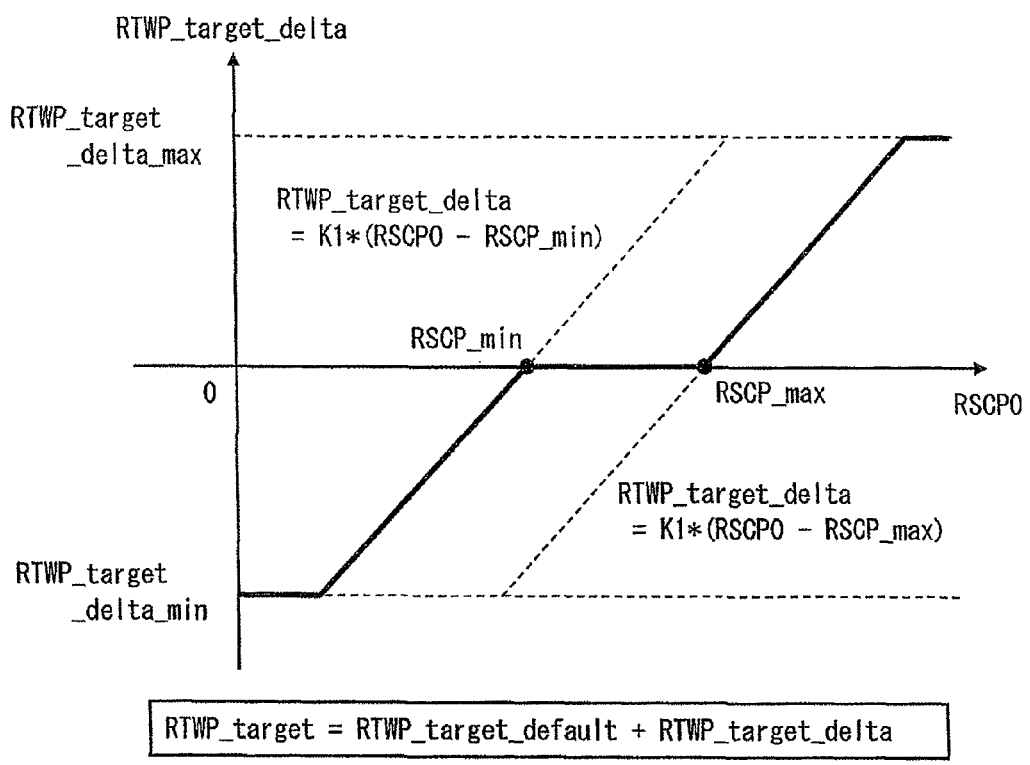
FIG. 9 is a graph for explaining a procedure for adjusting an RTWP target value in accordance with a first specific example shown in FIG. 7.

FIG. 8 is a graph showing a relation between P_tx_offset_delta and RSCP0 that is determined by performing the steps S112 to S114 of FIG. 7. Further, FIG. 9 is a graph showing a relation between RTWP_target_delta and RSCP0 that is determined by performing the steps S112 to S114 of FIG. 7.

Second Specific Example

Figure 10:
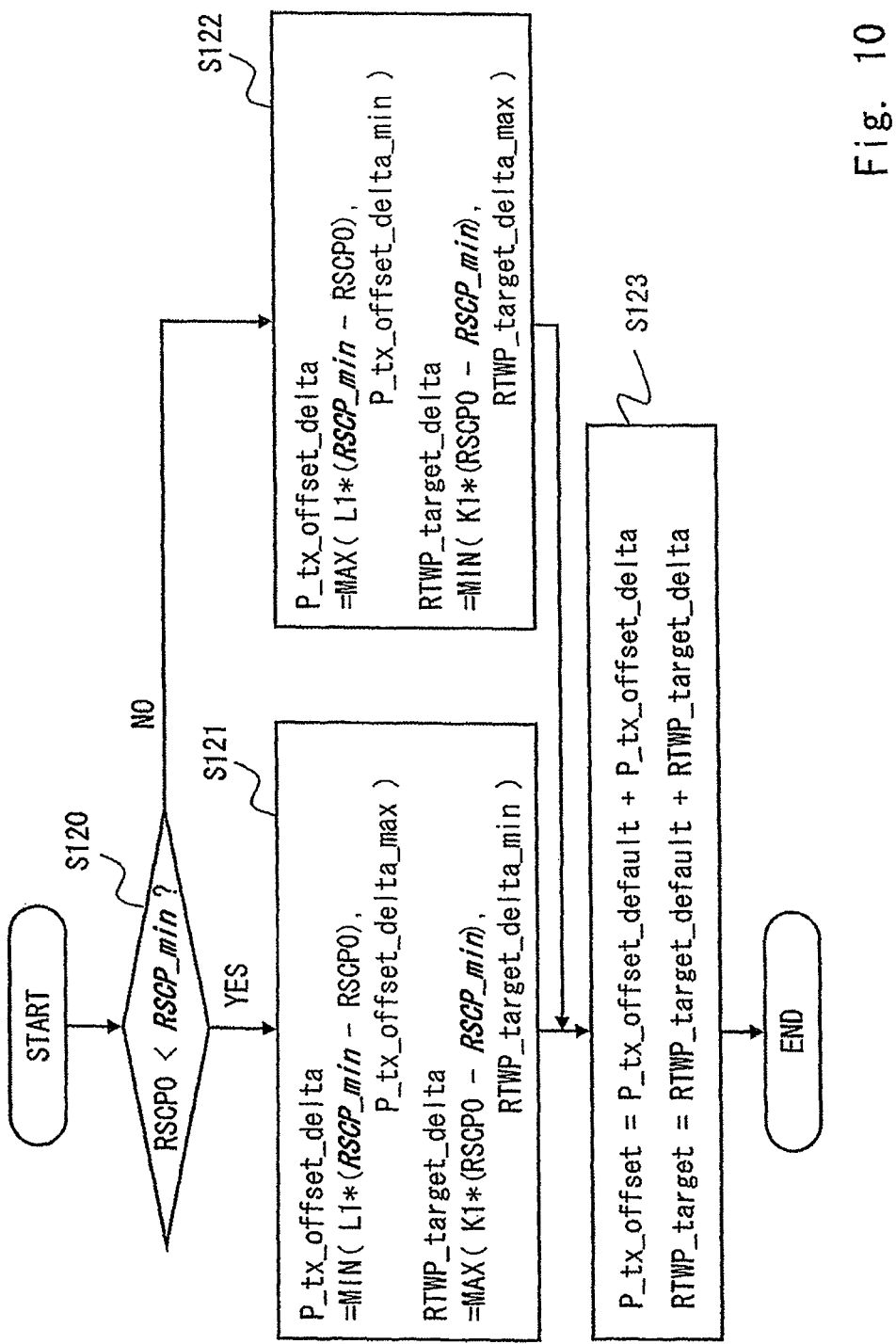
FIG. 10 is a flowchart showing a second specific example of a procedure for adjusting a CPICH transmission power offset and an RTWP target value.

FIG. 10 is a flowchart showing a second specific example of a procedure for adjusting P_tx_offset and RTWP_target. In the second specific example, P_tx_offset and RTWP_target are determined based on a relative comparison between RSCP_min and RSCP0 without referring to the maximum value RSCP_max measured by the mobile station.

In a step S120, RSCP_min is compared in magnitude with RSCP0. Then, when RSCP0 is determined to be smaller than the minimum value RSCP_min (Yes in step S120), the radio network control data setting unit 152 calculates P_tx_offset_delta and RTWP_target_delta by using the following equations (10) and (11) (step S121). Note that the equations (10) and (11) are the same as the above-described equations (4) and (5).

$$P\_tx\_\text{offset\_delta} = \text{MIN}(L1*(\text{RSCP\_min} - \text{RSCP0}), P\_tx\_\text{offset\_delta\_max}) \quad (10)$$

$$\text{RTWP\_target\_delta} = \text{MAX}(K1*(\text{RSCP0} - \text{RSCP\_min}), \text{RTWP\_target\_delta\_min}) \quad (11)$$

On the other hand, when RSCP0 is determined to be equal to or greater than the minimum value RSCP_min (No in step S120), the radio network control data setting unit 152 calculates P_tx_offset_delta and RTWP_target_delta by using the following equations (12) and (13) (step S122).

$$P\_tx\_\text{offset\_delta} = \text{MAX}(L1*(\text{RSCP\_min} - \text{RSCP0}), P\_tx\_\text{offset\_delta\_min}) \quad (12)$$

$$\text{RTWP\_target\_delta} = \text{MIN}(K1*(\text{RSCP0} - \text{RSCP\_min}), \text{RTWP\_target\_delta\_max}) \quad (13)$$

In a step S123, by using P_tx_offset_delta and RTWP_target_delta determined in the step S121 or S122, P_tx_offset and RTWP_target are calculated by using the above-described equations (2) and (3).

Figure 11:
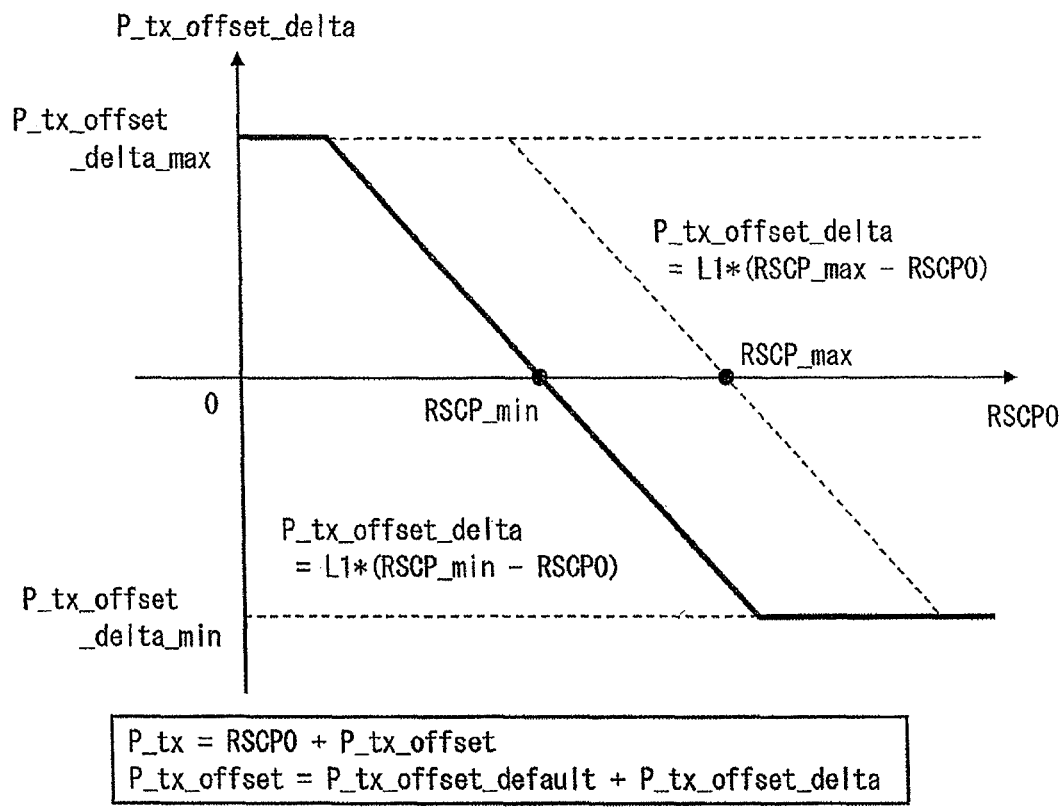
FIG. 11 is a graph for explaining a procedure for adjusting a CPICH transmission power offset in accordance with a second specific example shown in FIG. 10.

FIG. 11 is a graph showing a relation between P_tx_offset_delta and RSCP0 that is determined by performing the steps S121 and S122 of FIG. 10. Note that a graph showing the relation between RTWP_target and RSCP0 has the same shape as the graph obtained by flipping the graph shown in FIG. 11 around the horizontal axis (RSCP0 axis).

Figure 4:
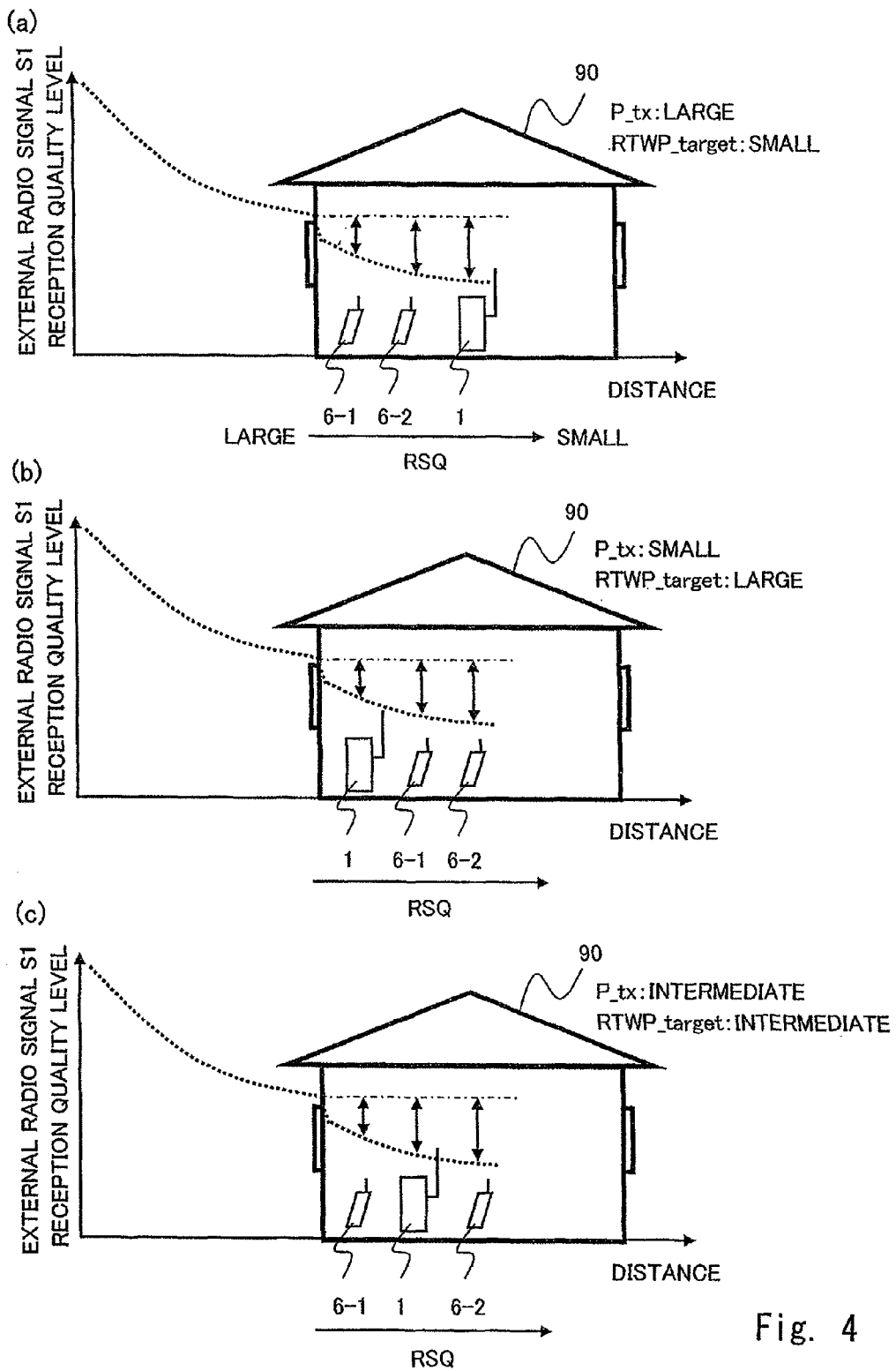
FIG. 4 is a conceptual diagram for explaining a radio parameter adjustment performed by a femto base station in accordance with a first exemplary embodiment of the present invention.

In the second specific example, since the comparison between RSCP0 and the maximum value RSCP_max is not performed, detailed estimation of the positional relation of the femto base station 1 and the mobile stations 6-1 and 6-2 inside the building, i.e., the differentiation between the positional relation of FIG. 4(*b*) and the positional relation of FIG. 4(*c*) is not performed. However, within the range in which RSCP0 is larger than the minimum value RSCP_min, as RSCP0 increases, P_tx_offset_delta is gradually decreased while RTWP_target_delta is gradually increased. Therefore, P_tx and RTWP_target can be also adjusted in a similar manner to that explained above with reference to FIGS. 3 and 4.

Third Specific Example

Figure 12:
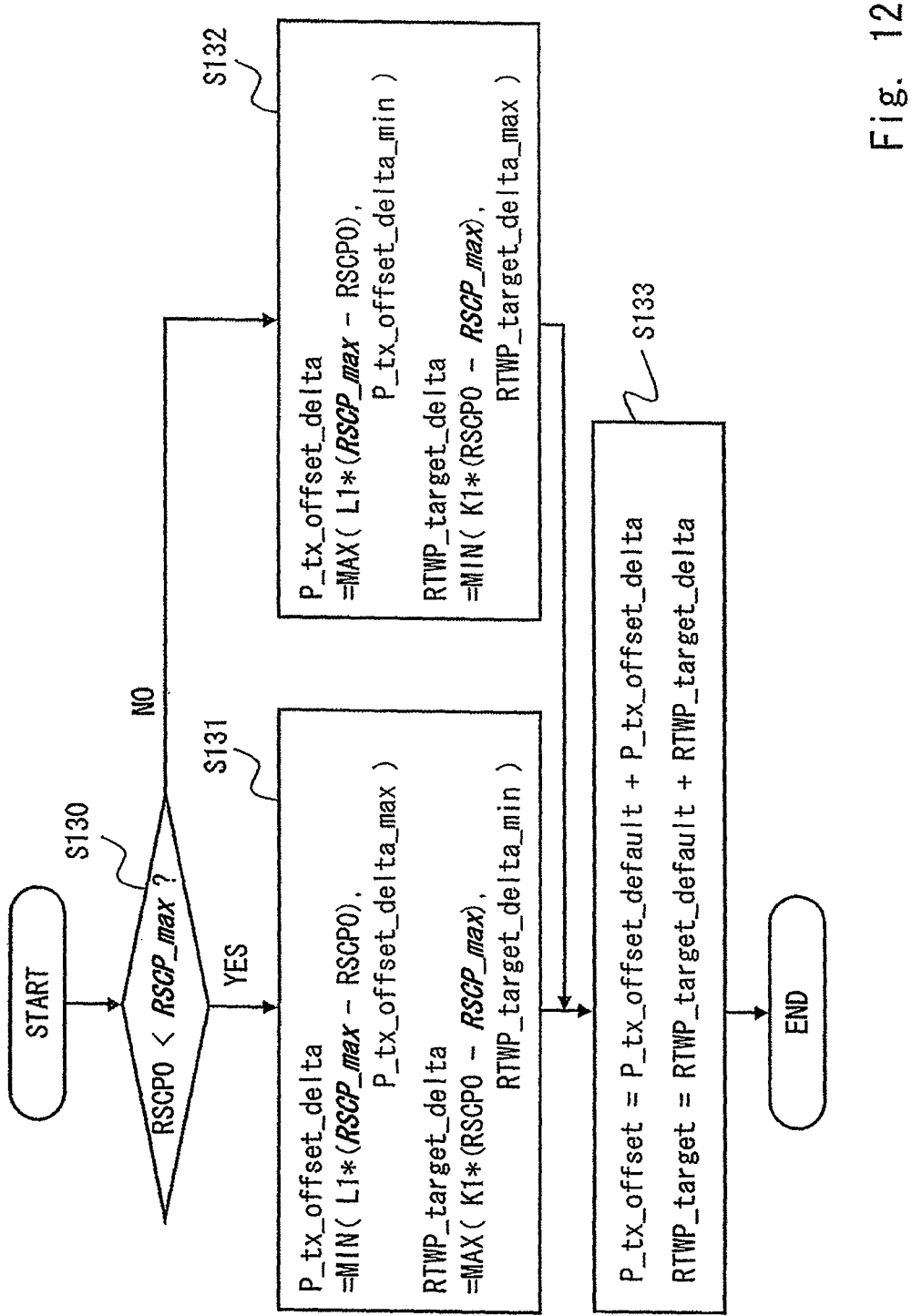
FIG. 12 is a flowchart showing a third specific example of a procedure for adjusting a CPICH transmission power offset and an RTWP target value.

FIG. 12 is a flowchart showing a third specific example of a procedure for adjusting P_tx_offset and RTWP_target. In the third specific example, P_tx_offset and RTWP_target are determined based on a relative comparison between RSCP_max and RSCP0 without referring to the minimum value RSCP_min measured by the mobile station.

In a step S130, RSCP_max is compared in magnitude with RSCP0. Then, when RSCP0 is determined to be smaller than the maximum value RSCP_max (Yes in step S130), the radio network control data setting unit 152 calculates P_tx_offset_delta and RTWP_target_delta by using the following equations (14) and (15) (step S131).

$$P\_tx\_\text{offset\_delta} = \text{MIN}(L1*(\text{RSCP\_max} - \text{RSCP0}), P\_tx\_\text{offset\_delta\_max}) \quad (14)$$

$$\text{RTWP\_target\_delta} = \text{MAX}(K1*(\text{RSCP0} - \text{RSCP\_max}), \text{RTWP\_target\_delta\_min}) \quad (15)$$

On the other hand, when RSCP0 is determined to be equal to or greater than the maximum value RSCP_max (No in step S130), the radio network control data setting unit 152 calculates P_tx_offset_delta and RTWP_target_delta by using the following equations (16) and (17) (step S132). Note that the equations (10) and (11) are the same as the above-described equations (6) and (7).

$$P\_tx\_\text{offset\_delta} = \text{MAX}(L1*(\text{RSCP\_max} - \text{RSCP0}), P\_tx\_\text{offset\_delta\_min}) \quad (16)$$

$$\text{RTWP\_target\_delta} = \text{MIN}(K1*(\text{RSCP0} - \text{RSCP\_max}), \text{RTWP\_target\_delta\_max}) \quad (17)$$

In a step S133, by using P_tx_offset_delta and RTWP_target_delta determined in the step S131 or S132, P_tx_offset and RTWP_target are calculated by using the above-described equations (2) and (3).

Figure 13:
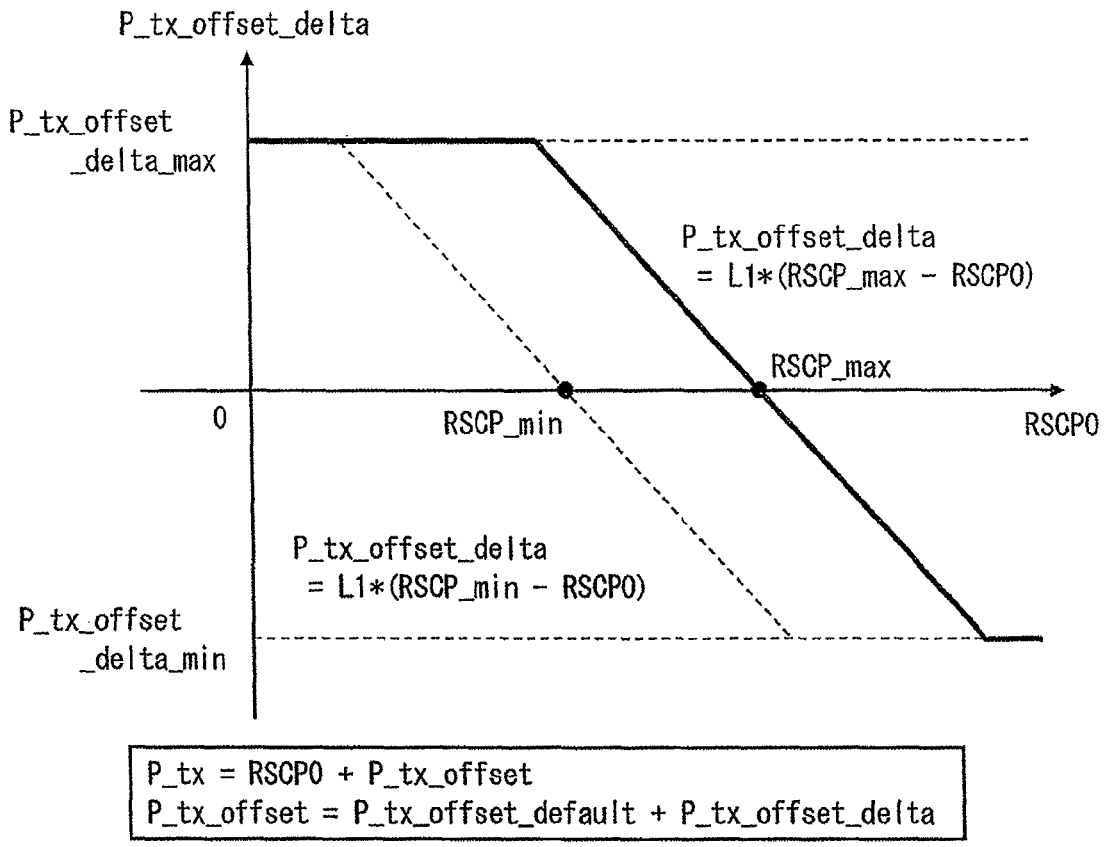
FIG. 13 is a graph for explaining a procedure for adjusting a CPICH transmission power offset in accordance with a third specific example shown in FIG. 12.

FIG. 13 is a graph showing a relation between P_tx_offset_delta and RSCP0 that is determined by performing the steps S131 and S132 of FIG. 12. Note that a graph showing the relation between RTWP_target and RSCP0 has the same shape as the graph obtained by flipping the graph shown in FIG. 13 around the horizontal axis (RSCP0 axis).

In the second specific example, since the comparison between RSCP0 and the minimum value RSCP_min is not performed, detailed estimation of the positional relation of the femto base station 1 and the mobile stations 6-1 and 6-2 inside the building, i.e., the differentiation between the positional relation of FIG. 4(*a*) and the positional relation of FIG. 4(*c*) is not performed. However, within the range in which RSCP0 is smaller than the maximum value RSCP_max, as RSCP0 increases, P_tx_offset_delta is gradually decreased while RTWP_target_delta is gradually increased. Therefore, P_tx and RTWP_target can be also adjusted in a similar manner to that explained above with reference to FIGS. 3 and 4.

Fourth Specific Example

Figure 14:
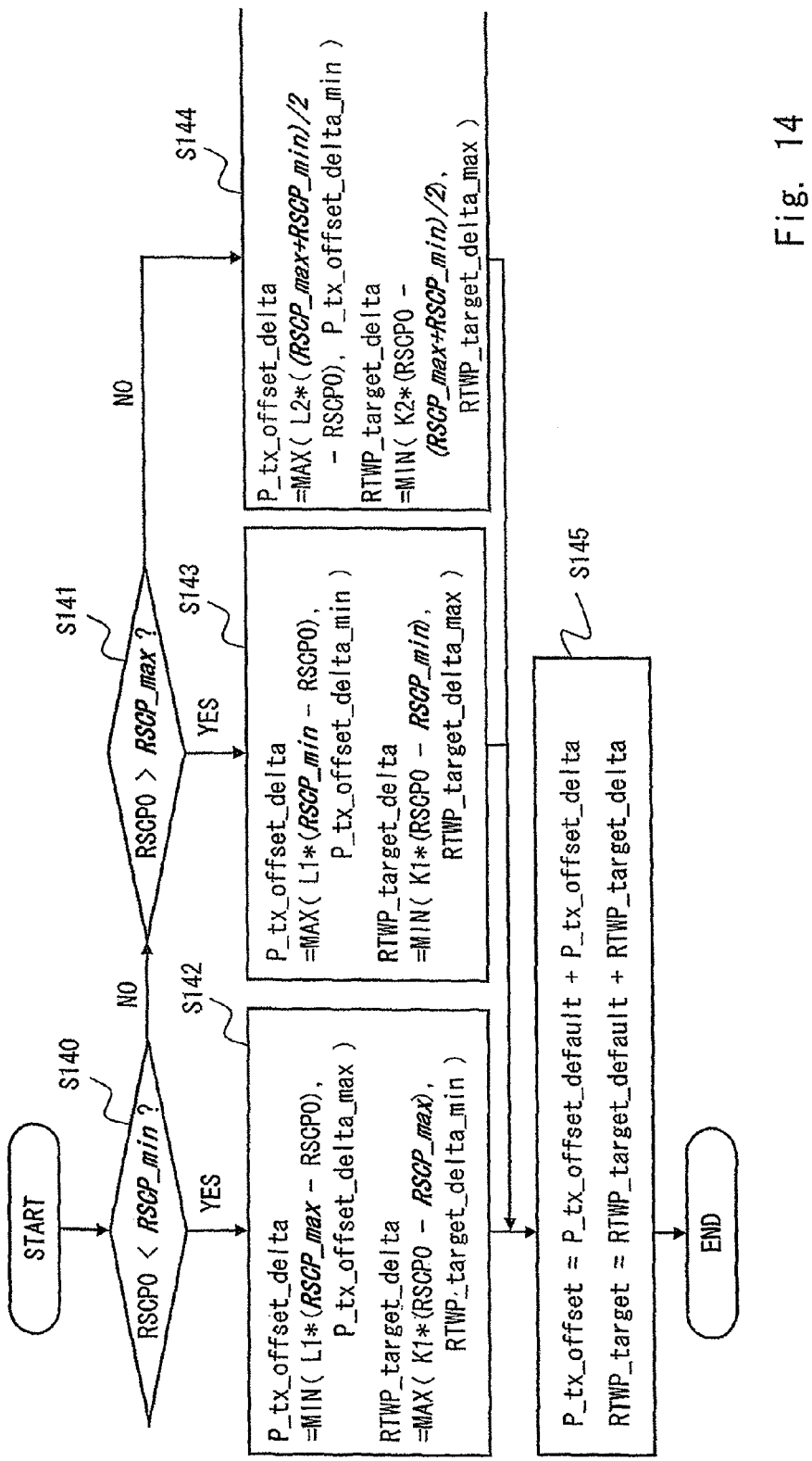
FIG. 14 is a flowchart showing a fourth specific example of a procedure for adjusting a CPICH transmission power offset and an RTWP target value.

FIG. 14 is a flowchart showing a third specific example of a procedure for adjusting P_tx_offset and RTWP_target. In steps S140 and S141, RSCP_min and RSCP_max are compared in magnitude with RSCP0.

When RSCP0 is determined to be smaller than the minimum value RSCP_min (Yes in step S140), the radio network control data setting unit 152 calculates P_tx_offset_delta and RTWP_target_delta by using the following equations (18) and (19) (step S142).

$$P\_tx\_\text{offset\_delta} = \text{MIN}(L1*(\text{RSCP\_max} - \text{RSCP0}), P\_tx\_\text{offset\_delta\_max}) \quad (18)$$

$$\text{RTWP\_target\_delta} = \text{MAX}(K1*(\text{RSCP0} - \text{RSCP\_max}), \text{RTWP\_target\_delta\_min}) \quad (19)$$

The step S142 corresponds to the step S16 of FIG. 3. That is, by calculating P_tx_offset_delta and RTWP_target_delta in accordance with the equations (18) and (19), the CPICH transmission power P_tx of the femto base station 1 can be relatively increased while the target value RTWP_target of the total uplink received power can be relatively decreased.

In contrast, when RSCP0 is determined to be greater than the maximum value RSCP_max (Yes in step S141), the radio network control data setting unit 152 calculates P_tx_offset_delta and RTWP_target_delta by using the following equations (20) and (21) (step S143).

$$P\_tx\_offset\_delta=MAX(L1*(RSCP\_min-RSCP0), P\_tx\_offset\_delta\_min) \quad (20)$$

$$RTWP\_target\_delta=MIN(K1*(RSCP0-RSCP\_min), RTWP\_target\_delta\_max) \quad (21)$$

The step S143 corresponds to the step S17 of FIG. 3. That is, by calculating P_tx_offset_delta and RTWP_target_delta in accordance with the equations (20) and (21), P_tx of the femto base station 1 can be relatively decreased while RTWP_target can be relatively increased.

Further, when the magnitude of RSCP0 is between the minimum value RSCP_min and the maximum value RSCP_max (No in step S141), the radio network control data setting unit 152 calculates P_tx_offset_delta and RTWP_target_delta by using the following equations (22) and (23) (step S144).

$$P\_tx\_offset\_delta=MAX(L2*((RSCP\_max+RSCP\_min)/2-RSCP0),P\_tx\_offset\_delta\_min) \quad (22)$$

$$RTWP\_target\_delta=MIN(K2*(RSCP0-(RSCP\_max+RSCP\_min)/2),RTWP\_target\_delta\_max) \quad (23)$$

In the equations, L2 and K2 are a positive constant.

The step S144 corresponds to the step S18 of FIG. 3. That is, by calculating P_tx_offset_delta and RTWP_target_delta in accordance with the equations (22) and (23), the magnitude of P_tx and RTWP_target can be determined to an intermediate value between the value determined in the step S142 and the value determined in the step S143.

In a step S145, by using P_tx_offset_delta and RTWP_target_delta determined by one of the steps S142 to S144, P_tx_offset and RTWP_target are calculated by using the above-described equations (2) and (3).

Figure 15:
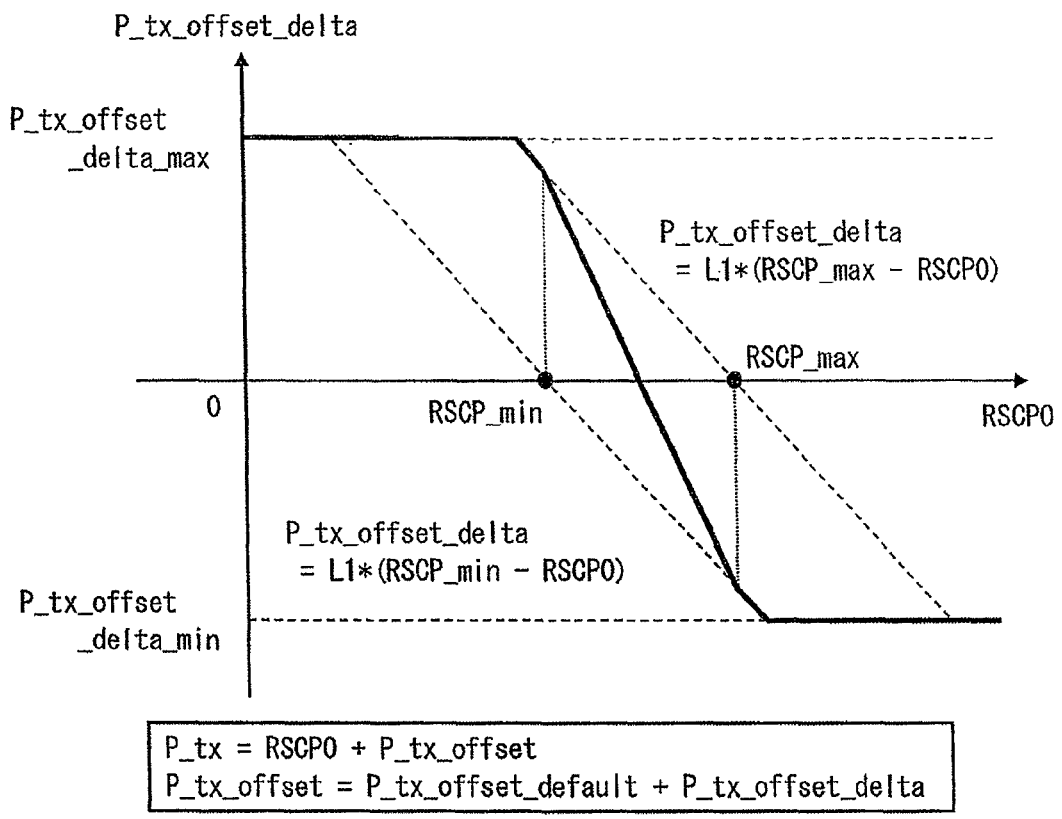
FIG. 15 is a graph for explaining a procedure for adjusting a CPICH transmission power offset in accordance with a fourth specific example shown in FIG. 14.

FIG. 15 is a graph showing a relation between P_tx_offset_delta and RSCP0 that is determined by performing the steps S142 to S144 of FIG. 14. Note that a graph showing the relation between and RTWP_target and RSCP0 has the same shape as the graph obtained by flipping the graph shown in FIG. 15 around the horizontal axis (RSCP0 axis).

Fifth Specific Example

A fifth specific example is a modified example of the first specific example. In the above-described first specific example, the minimum value of P_tx_offset_delta is a negative value and P_tx_offset is adjusted by increasing/decreasing it from P_tx_offset_default. In contrast to that, the minimum value of P_tx_offset_delta is zero in this example. Therefore, P_tx_offset is adjusted by increasing it from P_tx_offset_default while defining P_tx_offset_default as the base.

Figure 16:
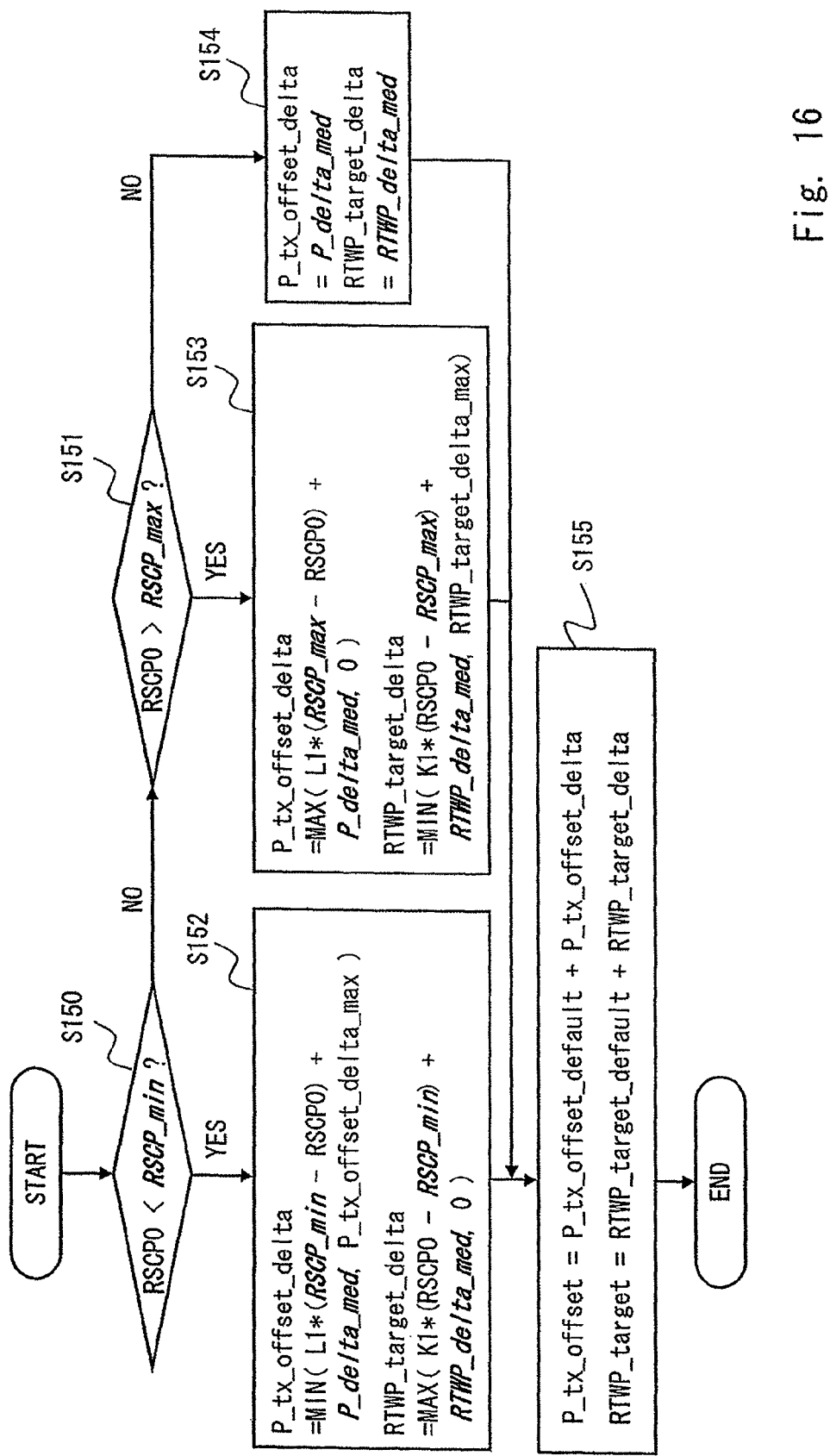
FIG. 16 is a flowchart showing a fifth specific example of a procedure for adjusting a CPICH transmission power offset and an RTWP target value.

FIG. 16 is a flowchart showing a fifth specific example of a procedure for adjusting P_tx_offset and RTWP_target. In steps S150 and S151, RSCP_min and RSCP_max are compared in magnitude with RSCP0.

When RSCP0 is determined to be smaller than the minimum value RSCP_min (Yes in step S150), the radio network control data setting unit 152 calculates P_tx_offset_delta and RTWP_target_delta by using the following equations (24) and (25) (step S112).

$$P\_tx\_offset\_delta=MIN(L1*(RSCP\_min-RSCP0)+P\_delta\_med,P\_tx\_offset\_delta\_max) \quad (24)$$

$$RTWP\_target\_delta=MAX(K1*(RSCP0-RSCP\_min)+RTWP\_delta\_med,0) \quad (25)$$

In the equations, P_offset_med is a positive value smaller than P_tx_offset_delta_max. RTWP_offset_med is a positive value smaller than RTWP_target_delta_max.

The step S152 corresponds to the step S16 of FIG. 3. That is, by calculating P_tx_offset_delta and RTWP_target_delta in accordance with the equations (24) and (25), the CPICH transmission power P_tx of the femto base station 1 can be relatively increased while the target value RTWP_target of the total uplink received power can be relatively decreased.

In contrast, when RSCP0 is determined to be greater than the maximum value RSCP_max (Yes in step S151), the radio network control data setting unit 152 calculates P_tx_offset_delta and RTWP_target_delta by using the following equations (26) and (27) (step S153).

$$P\_tx\_offset\_delta=MAX(L1*(RSCP\_max-RSCP0)+P\_delta\_med,0) \quad (26)$$

$$RTWP\_target\_delta=MIN(K1*(RSCP0-RSCP\_max)+RTWP\_delta\_med,RTWP\_target\_delta\_max) \quad (27)$$

The step S153 corresponds to the step S17 of FIG. 3. That is, by calculating P_tx_offset_delta and RTWP_target_delta in accordance with the equations (26) and (27), P_tx of the femto base station 1 can be relatively decreased while RTWP_target can be relatively increased.

Further, when the magnitude of RSCP0 is between the minimum value RSCP_min and the maximum value RSCP_max (No in step S151), the radio network control data setting unit 152 calculates P_tx_offset_delta and RTWP_target_delta by using the following equations (28) and (29) (step S114).

$$P\_tx\_offset\_delta=P\_delta\_med \quad (28)$$

$$RTWP\_target\_delta=RTWP\_delta\_med \quad (29)$$

The step S154 corresponds to the step S18 of FIG. 3. That is, by calculating P_tx_offset_delta and RTWP_target_delta in accordance with the equations (28) and (29), the magnitude of P_tx and RTWP_target can be determined to an intermediate value between the value determined in the step S152 and the value determined in the step S153.

In a step S155, by using P_tx_offset_delta and RTWP_target_delta determined by one of the steps S152 to S154, P_tx_offset and RTWP_target are calculated by using the above-described equations (2) and (3).

Figure 17:
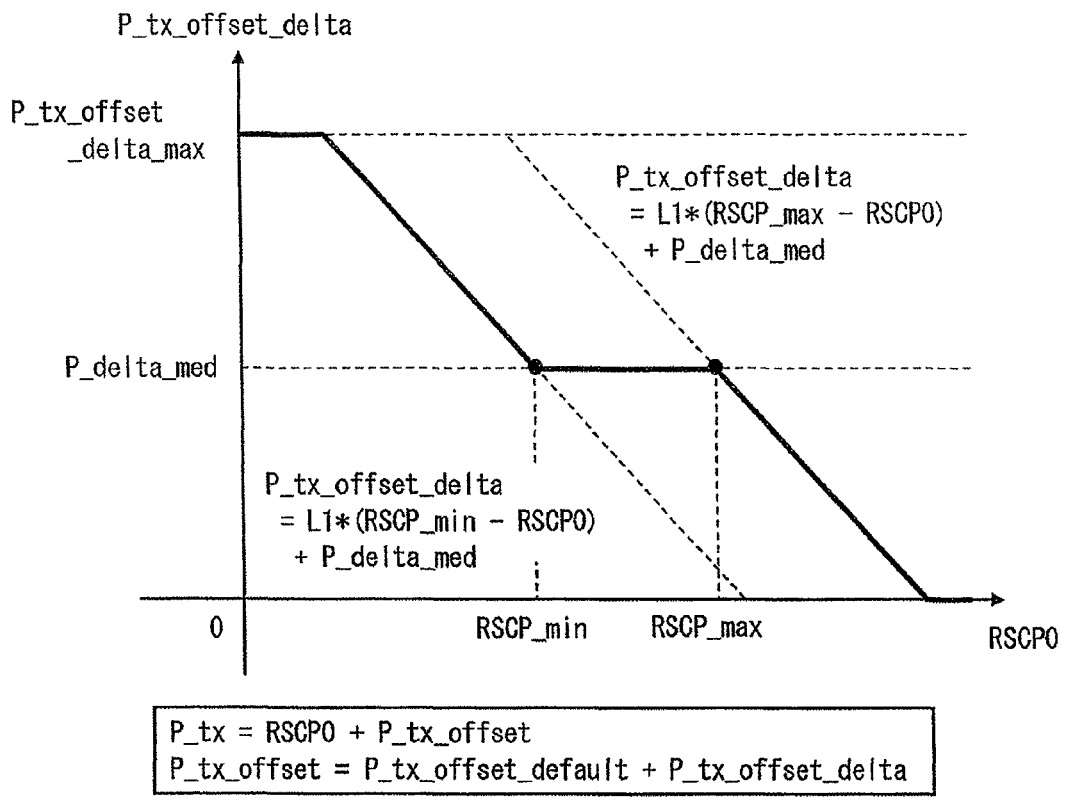
FIG. 17 is a graph for explaining a procedure for adjusting a CPICH transmission power offset in accordance with a fifth specific example shown in FIG. 16.

FIG. 17 is a graph showing a relation between P_tx_offset_delta and RSCP0 that is determined by performing the steps S152 to S154 of FIG. 16. Note that a graph showing the relation between RTWP_target and RSCP0 has the same shape as the graph obtained by flipping the graph shown in FIG. 17 around the horizontal axis that passes through P_offset_med.

Further, although any specific example is explained, the maximum value of P_tx_offset_delta may be set to zero as a modified example of the first and fifth specific examples. That is, P_tx_offset may be adjusted by decreasing it from P_tx_offset_default while defining P_tx_offset_default as the maximum value of P_tx_offset.

Further, a similar modification to the above-described modification from the first specific example to the fifth specific example may be made to the second, third and fourth specific examples.

Incidentally, a lot of calculation processes involved in the radio parameter determination procedure performed by the femto base station 1 in accordance with this exemplary embodiment can be implemented by causing a computer such as a microprocessor to execute a program for base station control. Specifically, it may be performed by causing a computer running a base station control program to execute the processes in the steps S13 to S18 of FIG. 3 or the processes in the steps S23 and S24 of FIG. 6.

Note that the program can be stored in various types of storage media, or can be transmitted through a communication medium. Example of the storage media include flexible discs, hard disk drives, magnetic discs, magneto-optic discs, CD-ROMs, DVDs, ROM cartridges, RAM memory cartridges with battery backup, flash memory cartridges, and nonvolatile RAM cartridges. Further, examples of the communication medium include wired communication media such as telephone lines, wireless communication media such as microwave lines, and Internet.

Second Exemplary Embodiment of the Invention

Figure 18:
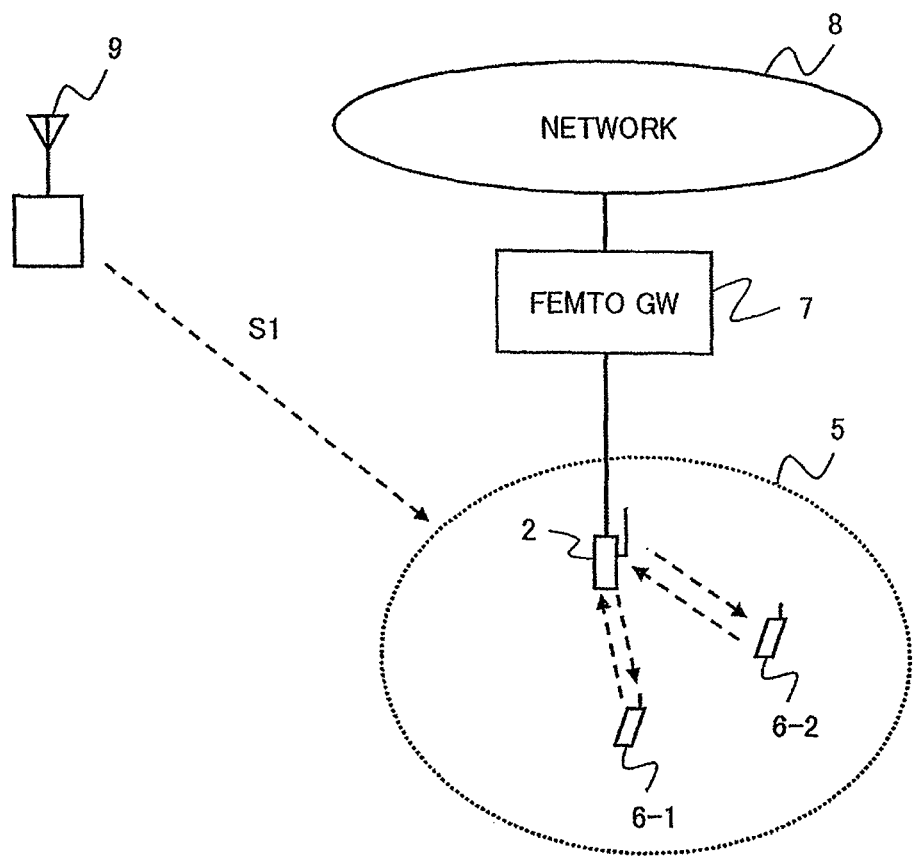
FIG. 18 is a configuration diagram of a radio communication system including a femto base station in accordance with a second exemplary embodiment of the present invention.

FIG. 18 is a configuration example of a radio communication system including a femto base station 2 in accordance with this exemplary embodiment. Similarly to the above-described femto base station 1, the femto base station 2 determines a radio parameter(s) by using the reception quality of the external radio signal 51 transmitted from the external radio station 9. However, the procedure for determining a radio parameter performed by the femto base station 2 is different in detail from that of the above-described femto base station 1. In the above-described femto base station 1, the femto base station 1 itself and the mobile stations 6-1 and 6-2 measure the reception quality of the external radio signal S1 and a radio parameter is determined by performing a relative comparison of the obtained reception quality levels. In contrast to this, the femto base station 2 determines a radio parameter(s) by using a measurement result of reception quality of the external radio signal S1 by the mobile stations 6-1 and 6-2 and a measurement result of a path loss without measuring the reception quality of the external radio signal S1 by the femto base station 2 itself. Note that the path loss is a loss caused in a wireless section between the femto base station 2 and the mobile stations 6-1 and 6-2.

Figure 19:
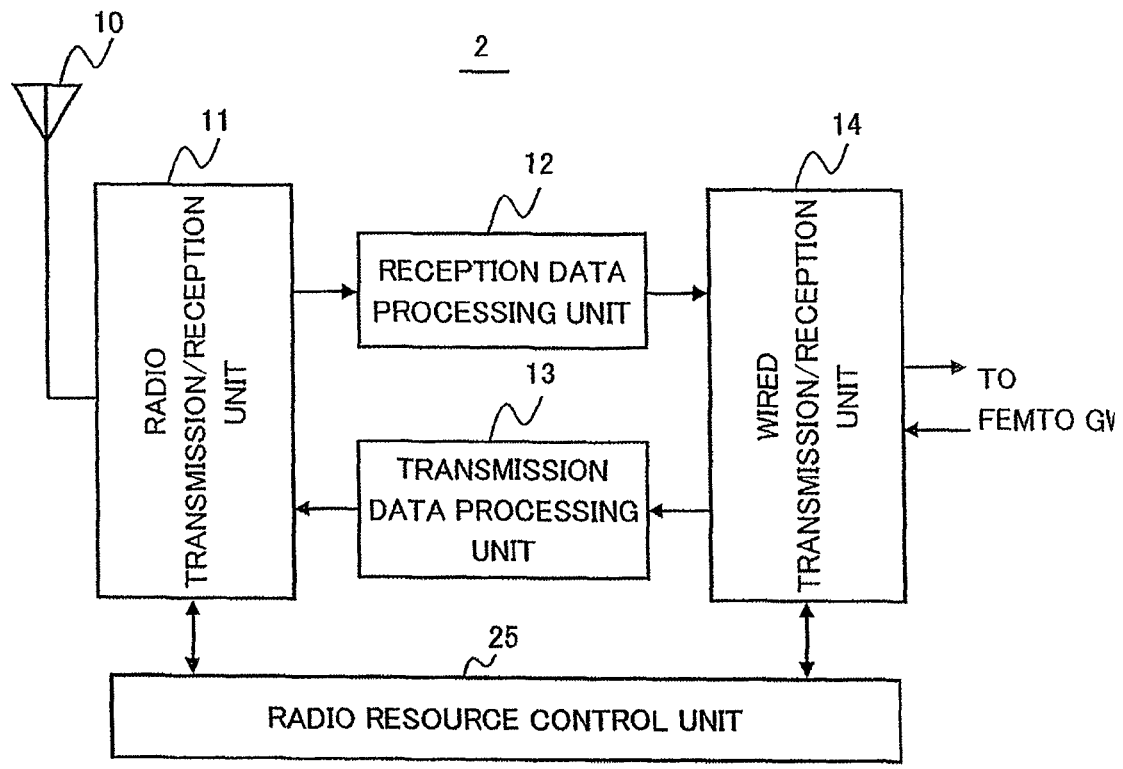
FIG. 19 is a block diagram of a femto base station in accordance with a second exemplary embodiment of the present invention.

FIG. 19 is a block diagram showing a configuration of the femto base station 2. In FIG. 19, a radio resource control unit 25 supplies a radio parameter(s) relating to a radio resource(s), which is used when a radio transmission/reception unit 11 transmits/receives a radio signal, to the radio transmission/reception unit 11. At least one parameter that affects the magnitude of the transmission power of the femto base station 2 or the magnitude of the transmission power of the mobile stations 6-1 and 6-2 is included in a plurality of radio parameters that are designated by the radio resource control unit 25. Note that other components shown in FIG. 19 are similar to those included in the femto base station 1 shown in FIG. 2.

Next, a specific example of a procedure for determining a radio parameter performed by the femto base station 2 is explained. In this example, a case where a CPICH transmission power P_tx of the femto base station 2 and a target value RTWP_target of the total uplink received power are adjusted is explained in a concrete manner. Further, the following explanation is made on the assumption that the external radio station 9 is a macro base station, that the external radio signal S1 is a macro CPICH, and that an RSCP of the macro CPICH is used as the reception quality of the external radio signal S1.

Figure 20:
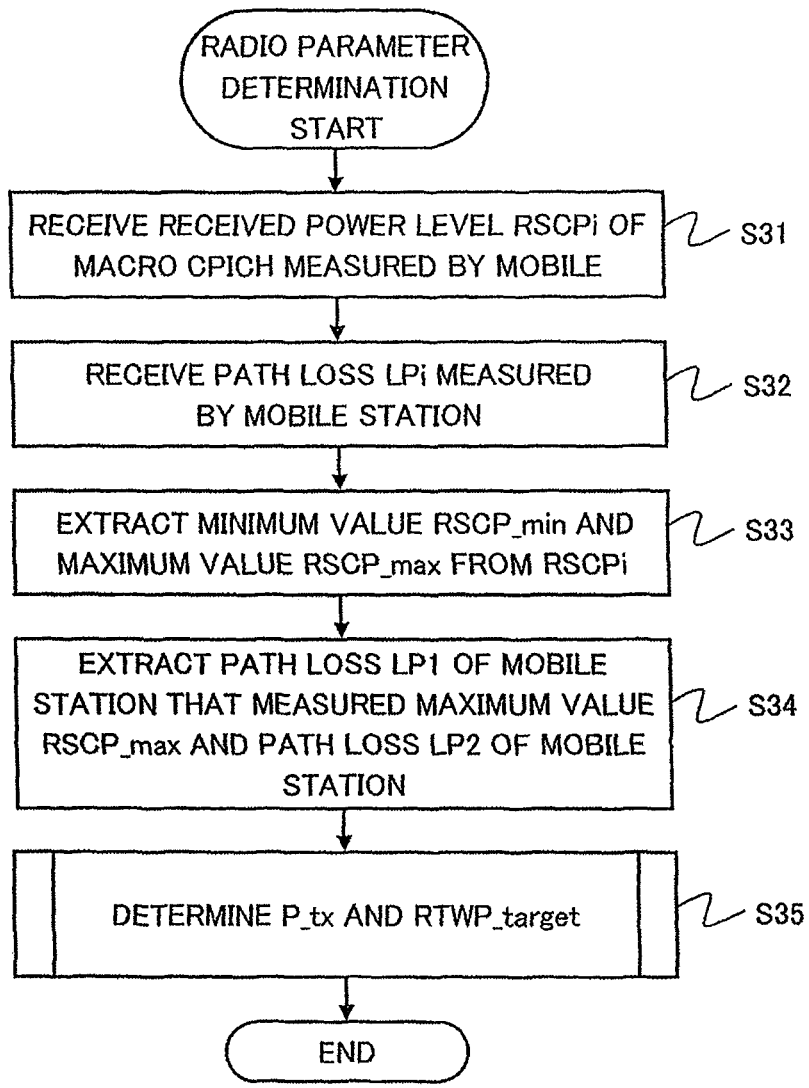
FIG. 20 is a flowchart showing a radio parameter adjustment procedure performed by a femto base station in accordance with a second exemplary embodiment of the present invention.

FIG. 20 is a flowchart showing a radio parameter adjustment procedure performed by the femto base station 2. In a step S31, the radio resource control unit 25 receives a received power level RSCPi of a macro CPICH measured by the mobile stations 6-1 and 6-2.

In a step S32, the radio resource control unit 25 receives a path loss measured by the mobile stations 6-1 and 6-2. In the following explanation, a path loss measured by the mobile stations 6-1 and 6-2 is referred to as "LPi" (i is an integer equal to or greater than one). The path loss LPi may be obtained by calculating a difference between a transmission level of a radio signal transmitted from the femto base station 2 and a reception level at the mobile stations 6-1 and 6-2. To that end, a radio signal for which a transmission power level by the femto base station 2 is already known in the mobile stations 6-1 and 6-2 (e.g., CPICH) may be used.

In a step S33, the radio resource control unit 25 extracts a minimum value RSCP_min and a maximum value RSCP_max from among a plurality of RSCPi. Note that the minimum value RSQ_min and the maximum value RSQ_max extracted in this process may be any substantial minimum value and maximum value. For example, the minimum value RSQ_min and the maximum value RSQ_max may be obtained after eliminating inappropriate RSQi values that might have been caused by an incorrect measurement or an unexpected disturbance.

In a step S34, a path loss LP1 of a mobile station that has measured the maximum value RSCP_max and a path loss LP2 of a mobile station that has measured the minimum value RSCP_min are extracted. When a single mobile station performs multiple measurements, a path loss LPi that is measured at a point at which the maximum value RSCP_max is measured may be extracted as the path loss LP1. Similarly, a path loss LPi that is measured at a point at which the minimum value RSCP_min is measured may be extracted as the path loss LP2.

In a step S35, a positional relation of the femto base station 2 and the mobile stations 6-1 and 6-2 in the building is estimated by comparing the magnitude relation of RSCP is among mobile stations and comparing the magnitude relation of the path loss LPi among mobile stations. Then, the CPICH transmission power P_tx of the femto base station 2 and the target value RTWP_target of the total uplink received power are determined according to the estimation result.

Figure 21:
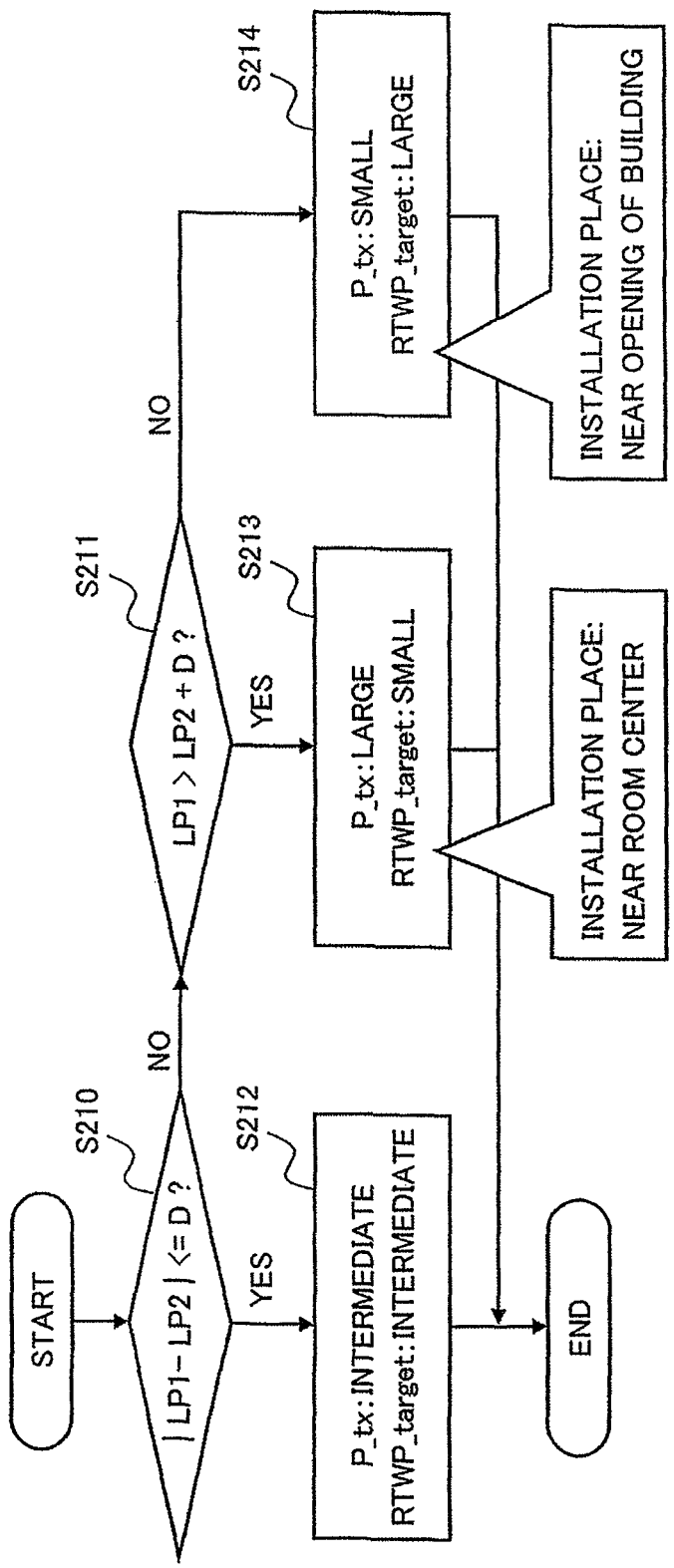
FIG. 21 is a flowchart showing a radio parameter adjustment procedure performed by a femto base station in accordance with a second exemplary embodiment of the present invention.

FIG. 21 is a flowchart showing a detailed procedure of the step S35 of FIG. 20. In steps S210 and S211, the path losses LP1 and LP2 are compared in magnitude. Then, when the absolute value of the difference between LP1 and LP2 is greater than a predefined reference value D and LP1 is greater than LP2 (Yes in step S211), the radio resource control unit 25 relatively increases the CPICH transmission power P_tx of the femto base station 2 and relatively decreases the target value RTWP_target of the total uplink received power (step S213).

Figure 22:
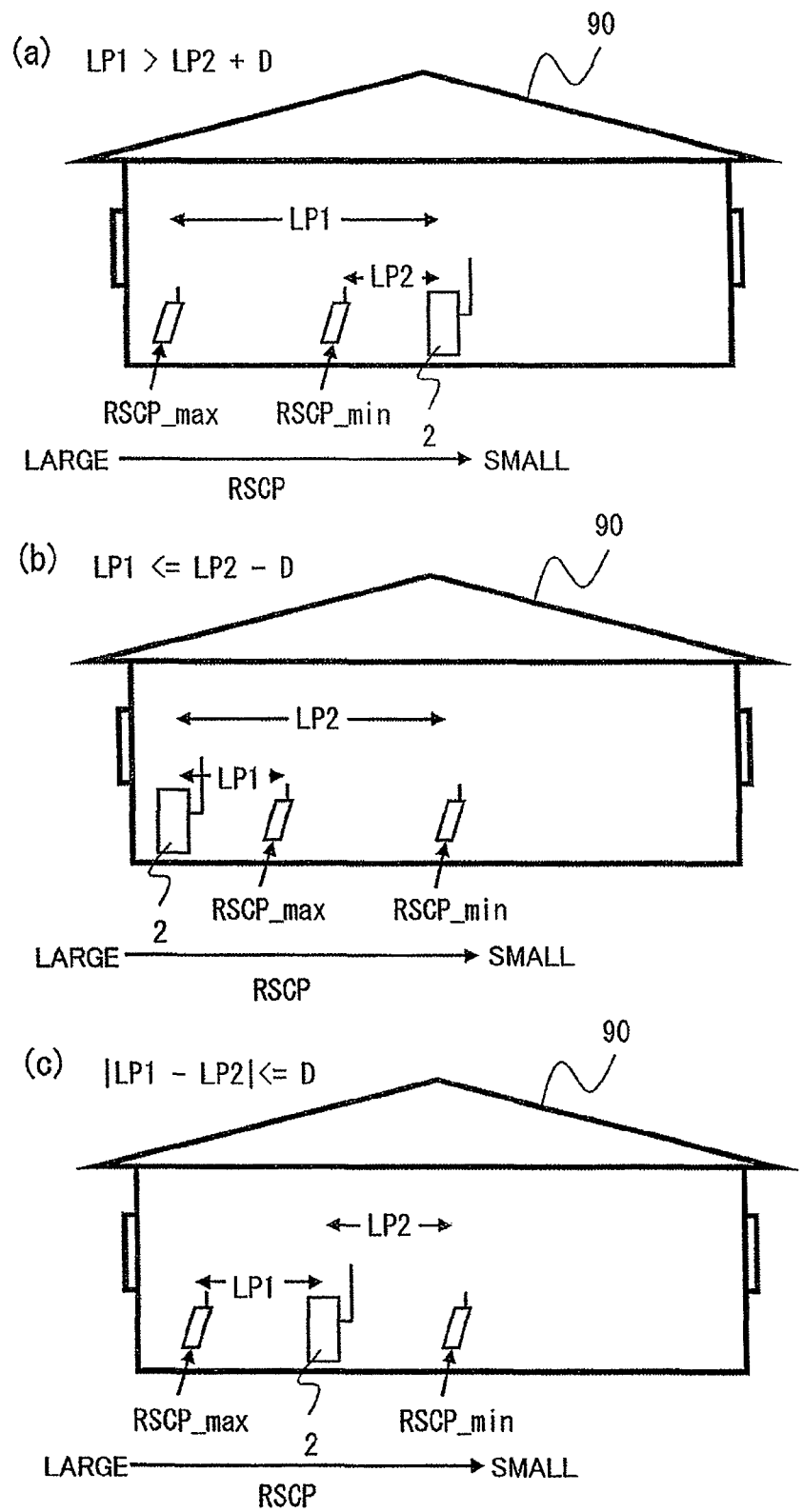
FIG. 22 is a conceptual diagram for explaining a radio parameter adjustment performed by a femto base station in accordance with a second exemplary embodiment of the present invention.

When the path loss LP1 of the mobile station that has measured the maximum value RSCP_max is sufficiently greater than the path loss LP2 of the mobile station that has measured the minimum value RSCP_min, it is presumed the femto base station 1 is located near the room center of the building 90, i.e., in a place from which the radio wave leakage to the outside less likely occurs as shown in FIG. 22(a). In contrast to this, the mobile stations 6-1 and 6-2 are presumed to be located near an opening of the building such as a window from which the radio wave leakage to the outside tends to occur. Therefore, in the step S213, the radio parameter is determined so that the transmission power of the femto base station 2 is relatively increased and the transmission power of the mobile stations 6-1 and 6-2 is relatively decreased.

Meanwhile, when the absolute value of the difference between LP1 and LP2 is greater than the predefined reference value D and LP2 is greater than LP1 (No in step S211), the radio resource control unit 25 relatively decreases the CPICH transmission power P_tx of the femto base station 2 and relatively increases the target value RTWP_target of the total uplink received power (step S214). This is because, when this condition is satisfied, it is presumed that the femto base station 2 is located near an opening of the building and that the mobile stations 6-1 and 6-2 are located near the room center as shown in FIG. 22(b).

Further, when the absolute value of the difference between LP1 and LP2 is smaller than the predefined reference value D (Yes in step S210), the radio resource control unit 25 brings the magnitude of the CPICH transmission power P_tx of the femto base station 2 to an intermediate level and also brings the magnitude of the target value RTWP_target of the total uplink radio parameter to an intermediate level (step S212). This is because, when this condition is satisfied, it is presumed, as shown in FIG. 22(c), that the disposition of the femto base station 2 and the mobile stations 6-1 and 6-2 is an intermediate disposition between that in FIG. 22(a) and that in FIG. 22(b).

Figure 23:
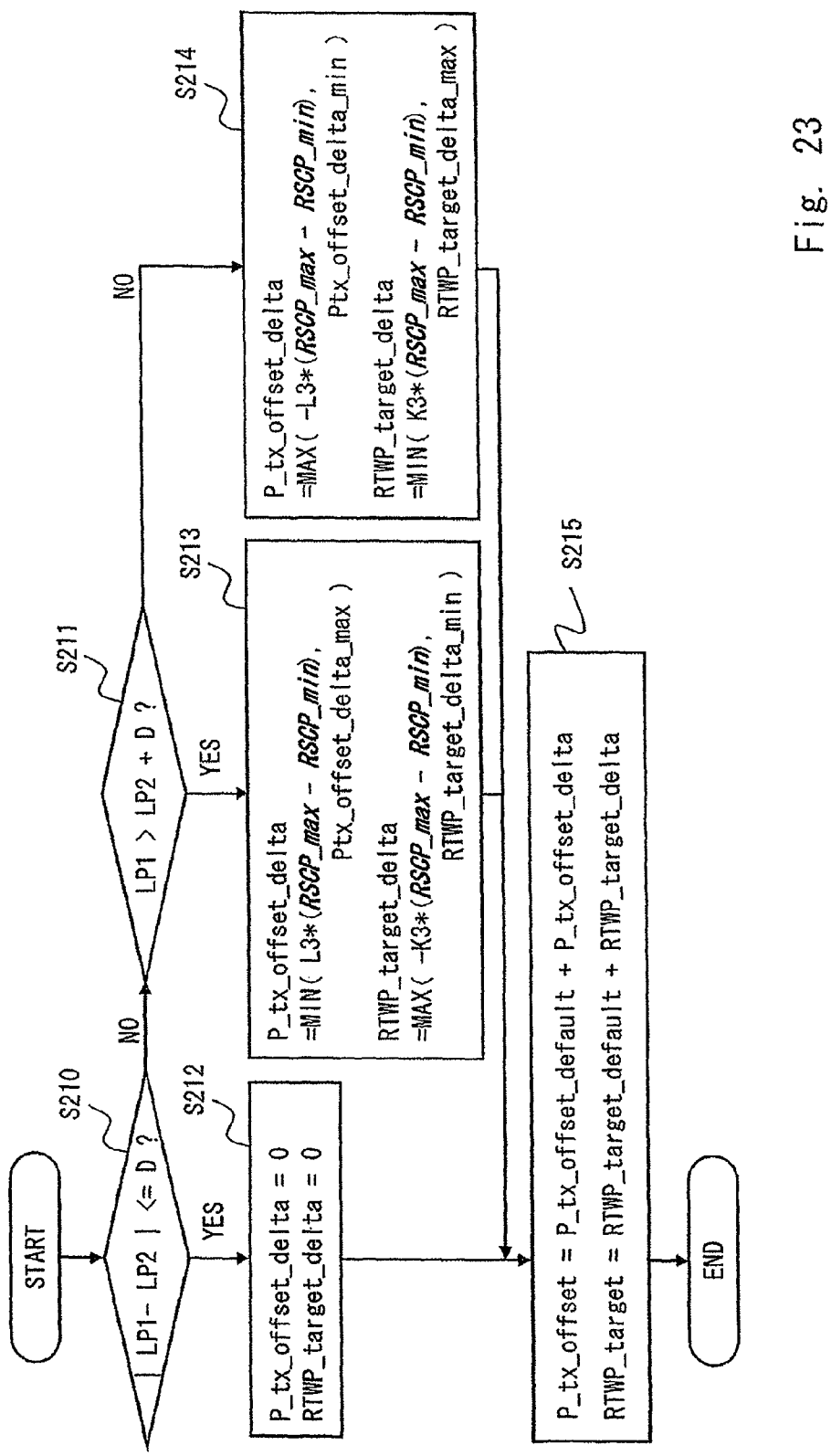
FIG. 23 is a flowchart showing another example of a radio parameter adjustment procedure performed by a femto base station in accordance with a second exemplary embodiment of the present invention.

The flowchart shown in FIG. 23, which corresponds to the above-described flowchart shown in FIG. 21, shows an example of calculating formulas used to determine P_tx and RTWP_target in the steps S212 to S214. To be more specific, the flowchart shown in FIG. 23 shows a specific procedure used to determine P_tx and RTWP_target by using the above-described equations (1) to (3).

In the step S212 of FIG. 23, P_tx_offset_delta and RTWP_target_delta are calculated by using the following equations (30) and (31).

$$P\_tx\_offset\_delta = 0 \quad (30)$$

$$RTWP\_target\_delta = 0 \quad (31)$$

In the step S213 of FIG. 23, P_tx_offset_delta and RTWP_target_delta are calculated by using the following equations (32) and (33).

$$P\_tx\_offset\_delta = MIN(L3*(RSCP\_max - RSCP\_min), P\_tx\_offset\_delta\_max) \quad (32)$$

$$RTWP\_target\_delta = MAX(-K3*(RSCP\_max - RSCP\_min), RTWP\_target\_delta\_min) \quad (33)$$

In the equations, L3 and K3 are a positive constant.

In the step S214 of FIG. 23, P_tx_offset_delta and RTWP_target_delta are calculated by using the following equations (34) and (35).

$$P\_tx\_offset\_delta = MAX(-L3*(RSCP\_max - RSCP\_min), P\_tx\_offset\_delta\_min) \quad (34)$$

$$RTWP\_target\_delta = MIN(K3*(RSCP\_max - RSCP\_min), RTWP\_target\_delta\_max) \quad (35)$$

As described above, a femto base station 2 in accordance with this exemplary embodiment can estimate a relative positional relation of the femto base station 2 and mobile stations 6-1 and 6-2 inside a building by comparing reception quality levels of the external radio signal S1 measured by the mobile stations 6-1 and 6-2 and comparing path losses measured by the mobile stations 6-1 and 6-2. Further, the femto base station 2 can provide, by using this estimation result, good communication quality inside a building while suppressing interference exerted on communication of other radio stations by radio waves leaked outside the building in order to adjust the transmission powers of the femto base station 2 and the mobile stations 6-1 and 6-2.

Further, since the femto base station 2 can estimate a relative positional relation between the femto base station 2 and the mobile stations 6-1 and 6-2 inside the building, the femto base station 2 can perform reciprocal radio resource control such that the transmission power of a radio station located in a place from which interference on other radio stations located outside the building is small (e.g., femto base station 2) is increased while the transmission power of a radio station located in a place from which interference on other radio stations located outside the building is large (e.g., mobile stations 6-1 and 6-2) is decreased.

Note that the procedure shown in FIGS. 21 and 23 is a merely an example. That is, the procedure for estimating a relative positional relation of the femto base station 2 and the mobile stations 6-1 and 6-2 inside a building based on a relative comparison between reception quality levels of the external radio signal S1 and a relative comparison between path losses is not limited to the procedure shown in FIGS. 21 and 23.

For example, when the mobile station that has measured the minimum value RSCP_min of a reception quality level is the same as the mobile station for which the path loss is smallest, the radio resource control unit 25 may relatively increase the CPICH transmission power P_tx of the femto base station 2 and relatively decrease the target value RTWP_target of the total uplink received power. Further, for example, when the mobile station that has measured the maximum value RSCP_max of a reception quality level is the same as the mobile station for which the path loss is smallest, the radio resource control unit 25 may relatively decrease the CPICH transmission power P_tx of the femto base station 2 and relatively increase the target value RTWP_target of the total uplink received power.

Further, the calculation of a path loss may be performed by the femto base station 2. Specifically, the femto base station 2 may receive a measurement result of a reception level of a radio signal that is transmitted from the femto base station 2 to the mobile stations 6-1 and 6-2 from the mobile stations 6-1 and 6-2, and calculate a path loss based on a difference between the received measurement result and its own transmission level.

Third Exemplary Embodiment of the Invention

Figure 24:
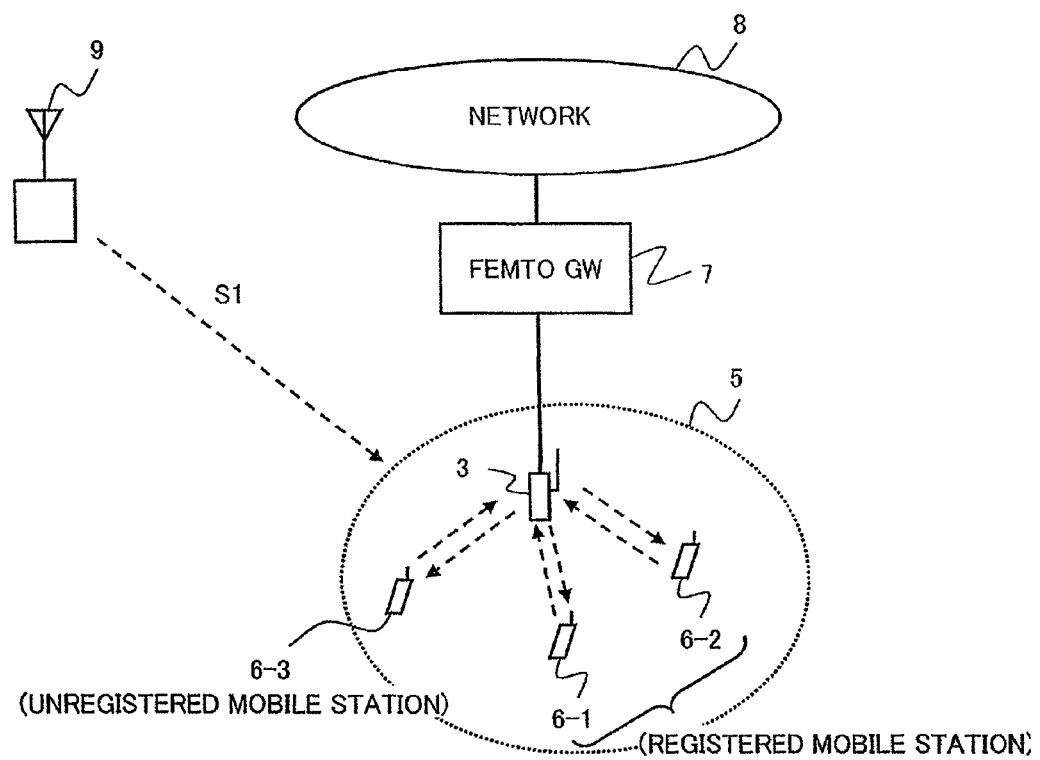
FIG. 24 is a configuration diagram of a radio communication system including a femto base station in accordance with a third exemplary embodiment of the present invention.

FIG. 24 is a configuration example of a radio communication system including a femto base station 3 in accordance with this exemplary embodiment. Similarly to the above-described femto base station 1, the femto base station 2 determines a radio parameter(s) by using the reception quality of the external radio signal S1 transmitted from the external radio station 9. However, the procedure for determining a radio parameter performed by the femto base station 3 is different in detail from that of the above-described femto base station 1.

The femto base station 3 has a function of registering identification information of a mobile station. In the following explanation, mobile stations 6-1 and 6-2 that are registered in advance in the femto base station 3 are called "registered mobile stations". Meanwhile, a mobile station 6-3 that is not registered in the femto base station 3 is called "unregistered mobile station". For example, a registered mobile station is a mobile station that is used by a user of the femto base station 3 and his/her family. Such a registered mobile station can be substantially regarded as a mobile station that communicates with the femto base station 3 inside a building within which the femto base station 3 is also installed. Meanwhile, a specific example of the unregistered mobile station is a mobile station that is possessed by a third person who has no close relation with the user of the femto base station 3. The principal installation place of the femto base station 3 is presumed to be a space, such as inside the home, to which access by an unspecified person is limited. Therefore, when an unregistered mobile station comes closer to the femto base station 3 and thereby is able to communicate with the femto base station 3, it can be substantially presumed that the unregistered mobile station is located outside the building within which the femto base station 3 is installed when the unregistered mobile station communicates with the femto base station 3.

Therefore, the femto base station 3 in accordance with this exemplary embodiment regards a reception quality level of the external radio signal S1 measured by an unregistered mobile station as a reception quality level measured outside the building, and defines the difference between this reception quality level measured outside the building and a reception quality level of the external radio signal S1 measured by the femto base station 3 itself as an estimated value $LB_E$ of the building penetration loss. Then, the transmission powers of the femto base station 3 and the registered mobile stations 6-1 and 6-2 are adjusted based on the estimated value $LB_E$ of the building penetration loss.

Figure 25:
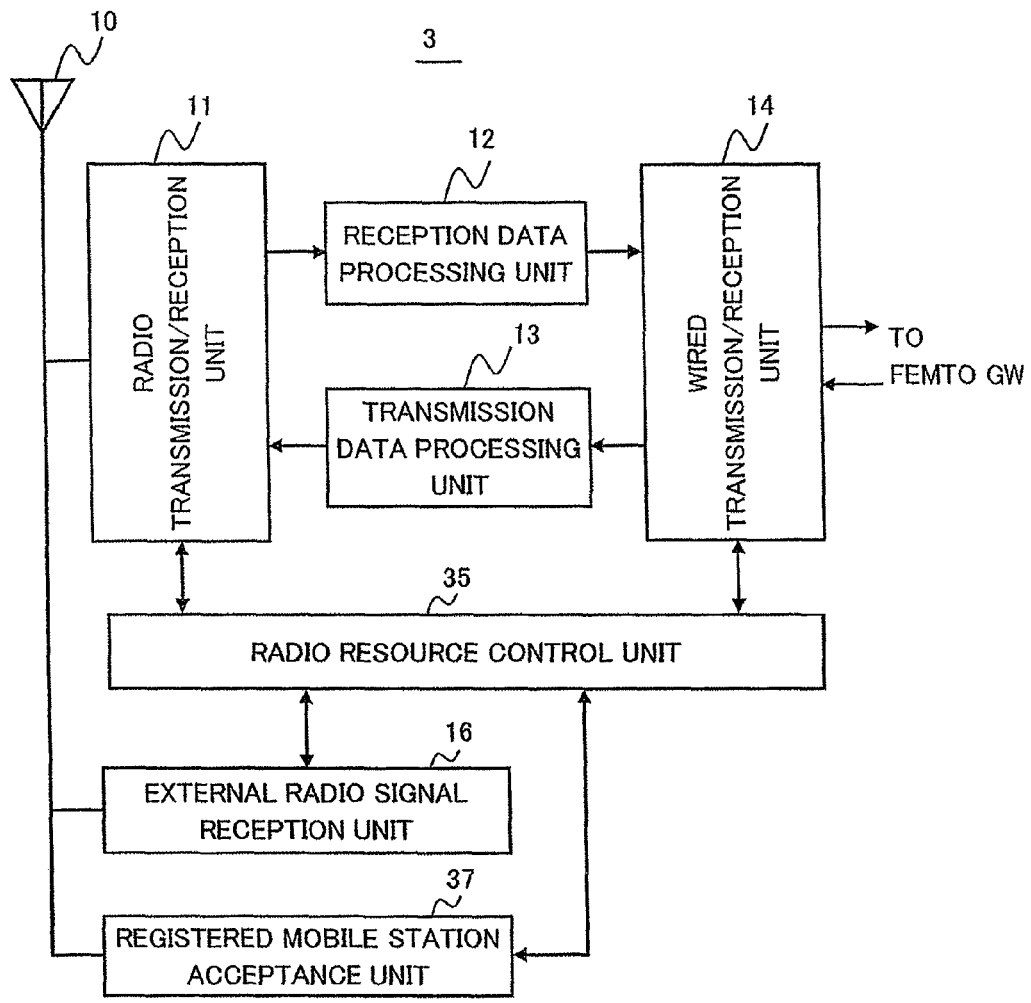
FIG. 25 is a block diagram of a femto base station in accordance with a third exemplary embodiment of the present invention.

FIG. 25 is a block diagram showing a configuration of the femto base station 3. In FIG. 25, a radio resource control unit 35 supplies a radio parameter(s) relating to a radio resource(s), which is used when a radio transmission/reception unit 11 transmits/receives a radio signal, to the radio transmission/reception unit 11. At least one parameter that affects the magnitude of the transmission power of the femto base station 3 or the magnitude of the transmission power of the mobile stations 6-1 and 6-2 is included in a plurality of radio parameters that are designated by the radio resource control unit 35.

A registered mobile station acceptance unit 37 receives a connection request transmitted from a mobile station and determines whether the mobile station that has transmitted the connection request is a registered mobile station or not. Examples of the connection request include a call-in from a mobile station, a reception of a position registration request that is transmitted from a mobile station as a cell selection operation is performed upon power-up of the mobile station, and a reception of a position registration request that is transmitted from a mobile station as a cell re-selection operation is performed upon change of the cell within which the mobile station is located.

The registered mobile station acceptance unit 37 permits connection to the femto base station 3 if the mobile station that has transmitted the connection request is a registered mobile station. Further, the registered mobile station acceptance unit 37 permits connection to the femto base station 3 even if the mobile station that has transmitted the connection request is an unregistered mobile station. In this case, the registered mobile station acceptance unit 37 may have a restriction such that unregistered mobile stations are permitted to connect unless the number of connected unregistered mobile stations does not exceed a predetermined upper limit, and/or impose communication regulation such as restricting the content of communication of an unregistered mobile station in comparison to that of a registered mobile station. An example of a restriction on communication contents is to limit the communication speed of an unregistered mobile station to a lower speed in comparison to that of a registered mobile station.

Next, a specific example of a procedure for determining a radio parameter performed by the femto base station 3 is explained hereinafter. In this example, a case where a CPICH transmission power P_tx of the femto base station 3 and a target value RTWP_target of the total uplink received power are adjusted is explained in a concrete manner. Further, the following explanation is made on the assumption that the external radio station 9 is a macro base station, that the external radio signal S1 is a macro CPICH, and that an RSCP of the macro CPICH is used as reception quality of the external radio signal S1.

Figure 26:
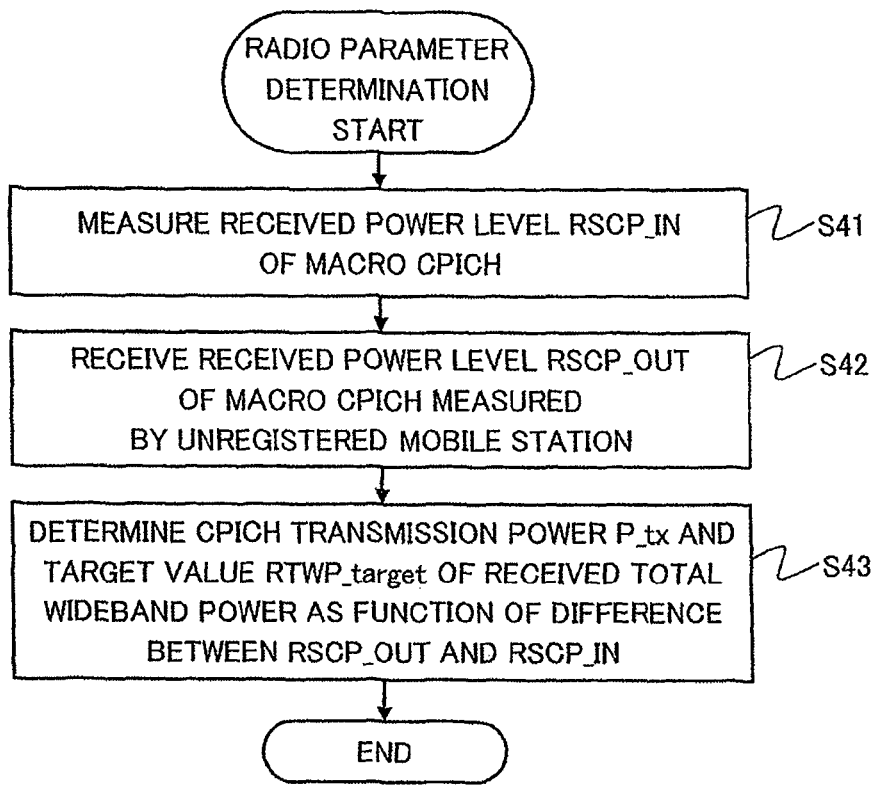
FIG. 26 is a flowchart showing a radio parameter adjustment procedure performed by a femto base station in accordance with a third exemplary embodiment of the present invention.

FIG. 26 is a flowchart showing a radio parameter adjustment procedure performed by the femto base station 3. In a step S41, the external radio signal reception unit 16 measures received power level RSCP_IN of a macro CPICH. In a step S42, the radio resource control unit 35 receives a received power level RSCP_OUT of a macro CPICH measured by the unregistered mobile station 6-3.

In a step S43, P_tx and RTWP_target are determined as a function of a difference between RSCP_OUT and RSCP_IN. For example, P_tx and RT_WP target may be calculated by using the following equations (36) and (37) having a positive correlation with the magnitude of the difference between RSCP_OUT and RSCP_IN.

$$P\_tx=\text{MEDIAN}(RSCP0+P\_tx\_\text{offset}+L4^* (RSCP\_OUT-RSCP\_IN),P\_tx\_\max,P\_tx\_\min) \quad (36)$$

$$RTWP\_target=\text{MEDIAN}(RTWP\_target\_default+K4^* (RSCP\_OUT-RSCP\_IN),RTWP\_target\_max, RTWP\_target\_min) \quad (37)$$

In the equations, L4 and K4 are a positive constant. P_tx_max is a value that is predefined as an upper-limit value of P_tx. P_tx_min is a value that is predefined as a lower-limit value of P_tx. RTWP_target_max is a value that is predefined as an upper-limit value of RTWP_target. RTWP_target_min is a value that is predefined as a lower-limit value of RTWP_target. Further, the function MEDIAN( ) is a function to obtain a median value from among a plurality of values designated as the arguments.

As for RSCP_OUT used in the step S43, a value obtained by a single unregistered mobile station may be used. Alternatively, an average value, a median value, or a given percent value of measured values obtained by multiple measurements by one or more than one unregistered mobile stations may be used. Similarly, as for RSCP_IN used in the step S43, an average value, a median value, or a given percent value of measured values obtained by multiple measurements may be used.

Figure 27:
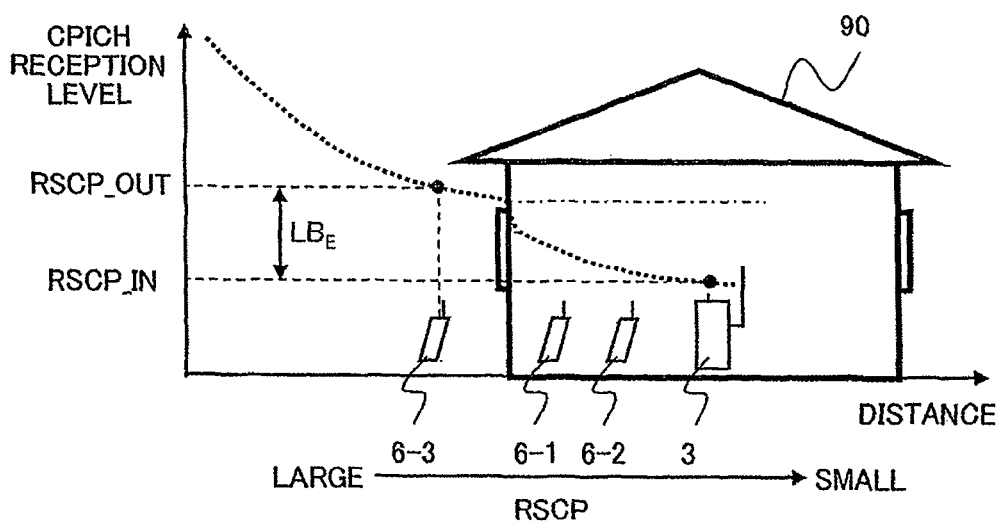
FIG. 27 is a conceptual diagram for explaining a radio parameter adjustment performed by a femto base station in accordance with a third exemplary embodiment of the present invention.

As shown in FIG. 27, the difference between RSCP_OUT measured by the unregistered mobile station 6-3 and RSCP_IN measured by the femto base station 3 can be used as an estimated value $LB_E$ of the building penetration loss in the installation place of the femto base station 3. As the estimated value $LB_E$ of the building penetration loss increases, the femto base station 3 increases the transmission power of the femto base station 3 and the registered mobile stations 6-1 and 6-2. That is, the femto base station 3 can control the transmission power of the femto base station 3 and the registered mobile stations 6-1 and 6-2 according to the magnitude of the building penetration loss at the installation place. Therefore, the femto base station 3 can provide good communication quality inside a building while suppressing interference exerted on communication of other radio stations by radio waves leaked outside the building.

Fourth Exemplary Embodiment of the Invention

Figure 28:
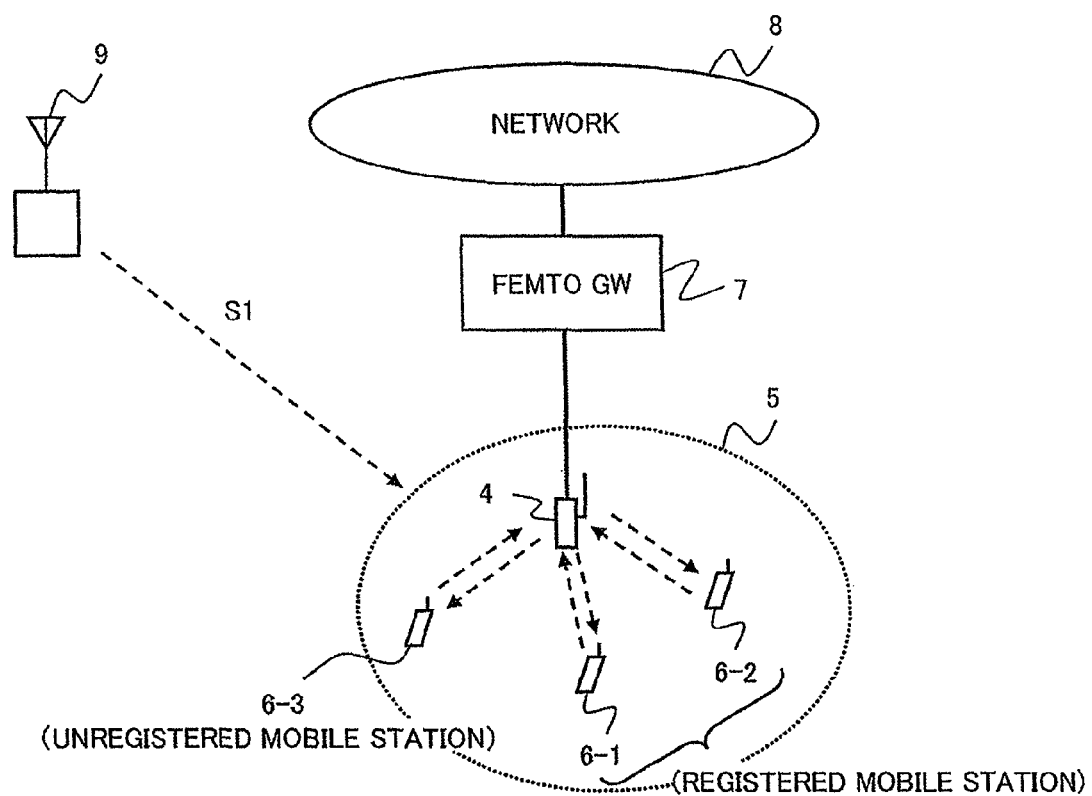
FIG. 28 is a configuration diagram of a radio communication system including a femto base station in accordance with a fourth exemplary embodiment of the present invention.

FIG. 28 is a configuration example of a radio communication system including a femto base station 4 in accordance with this exemplary embodiment. The femto base station 4 has the same feature as that of the above-described femto base station 3 in that the femto base station 4 controls the transmission power of the femto base station 3 and the registered mobile stations 6-1 and 6-2 by using the reception quality level of the external radio signal S1 measured by an unregistered mobile station. The difference between the femto base station 4 and the femto base station 3 lies in that the femto base station 4 uses a value measured by at least one of the registered mobile stations 6-1 and 6-2 as the indoor reception quality level of the external radio signal S1.

Figure 29:
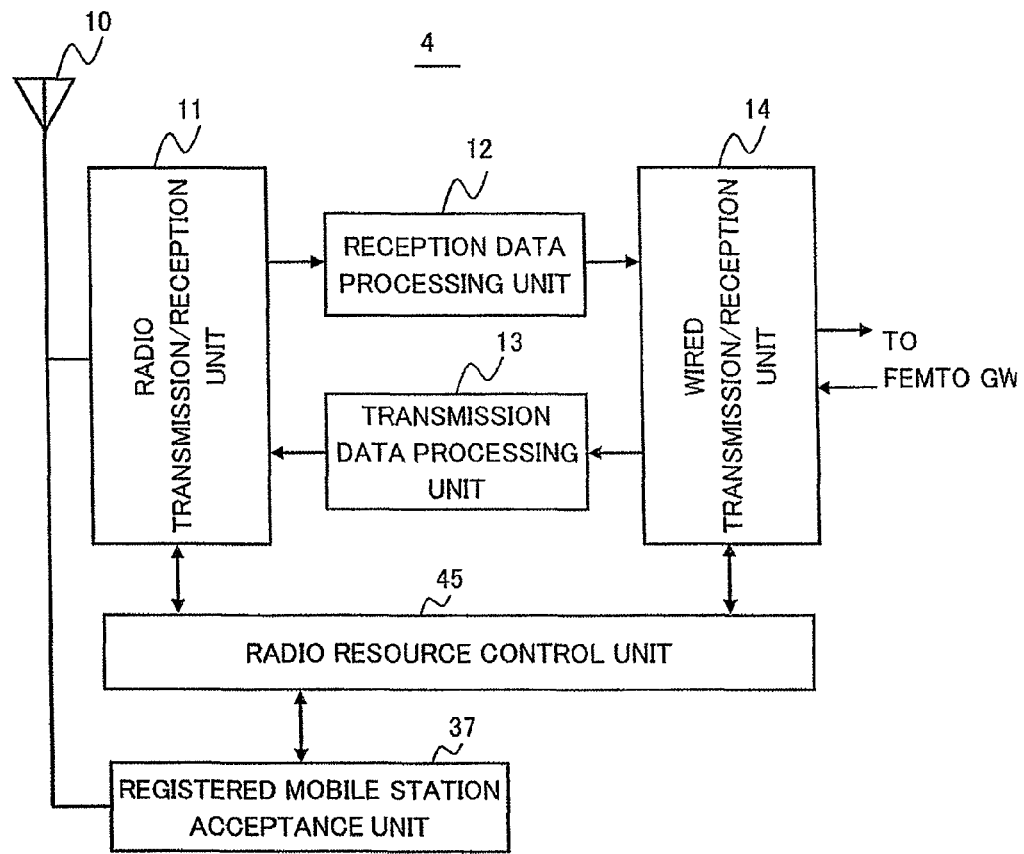
FIG. 29 is a block diagram of a femto base station in accordance with a fourth exemplary embodiment of the present invention.

FIG. 29 is a block diagram showing a configuration of the femto base station 4. In FIG. 29, a radio resource control unit 45 supplies a radio parameter(s) relating to a radio resource(s), which is used when a radio transmission/reception unit 11 transmits/receives a radio signal, to the radio transmission/reception unit 11. At least one parameter that affects the magnitude of the transmission power of the femto base station 4 or the magnitude of the transmission power of the mobile stations 6-1 and 6-2 is included in a plurality of radio parameters that are designated by the radio resource control unit 45.

Next, a specific example of a procedure for determining a radio parameter performed by the femto base station 4 is explained hereinafter. In this example, a case where a CPICH transmission power P_tx of the femto base station 4 and a target value RTWP_target of the total uplink received power are adjusted is explained in a concrete manner. Further, the following explanation is made on the assumption that the external radio station 9 is a macro base station, that the external radio signal S1 is a macro CPICH, and that an RSCP of the macro CPICH is used as reception quality of the external radio signal S1.

Figure 30:
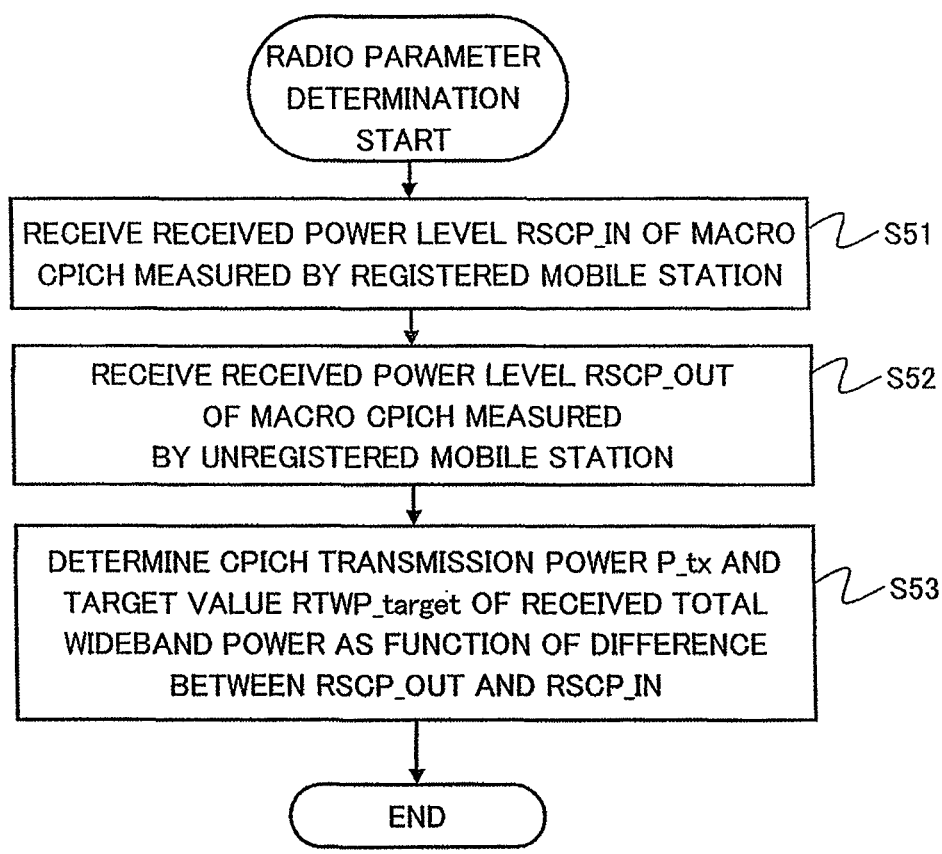
FIG. 30 is a flowchart showing a radio parameter adjustment procedure performed by a femto base station in accordance with a fourth exemplary embodiment of the present invention.

FIG. 30 is a flowchart showing a radio parameter adjustment procedure performed by the femto base station 4. In a step S51, the radio resource control unit 45 receives a received power level of a macro CPICH measured by at least one of the registered mobile stations 6-1 and 6-2. In this exemplary embodiment, the reception quality level of a macro CPICH received from a registered mobile station in the step S51 is referred to as "RSCP_IN". In a step S52, the radio resource control unit 45 receives the received power level RSCP_OUT of a macro CPICH measured by an unregistered mobile station 6-3.

In a step S53, P_tx and RTWP_target are determined as a function of a difference between RSCPout and RSCP0. For example, P_tx and RTWP_target may be calculated by using the above-shown equations (36) and (37) having a positive correlation with the magnitude of the difference between RSCP_OUT and RSCP_IN.

As for RSCP_OUT used in the step S53, a value obtained by a single unregistered mobile station may be used. Alternatively, an average, a median value, or a given percent value of measured values obtained by multiple measurements by one or more than one unregistered mobile stations may be used. Similarly, as for RSCP_IN used in the step S53, an average value, a median value, or a given percent value of measured values obtained by multiple measurements by one or more than one registered mobile stations may be used.

Figure 31:
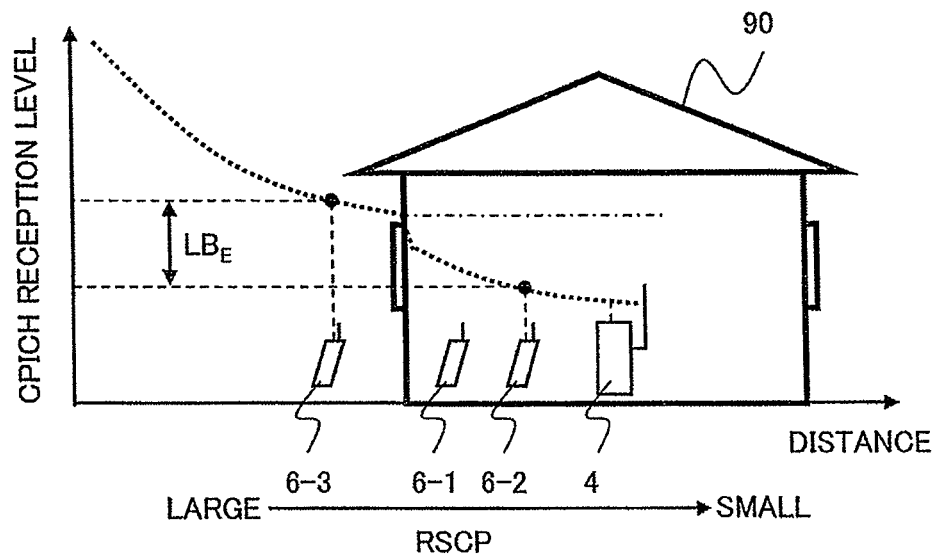
FIG. 31 is a conceptual diagram for explaining a radio parameter adjustment performed by a femto base station in accordance with a fourth exemplary embodiment of the present invention.
Figure 32:
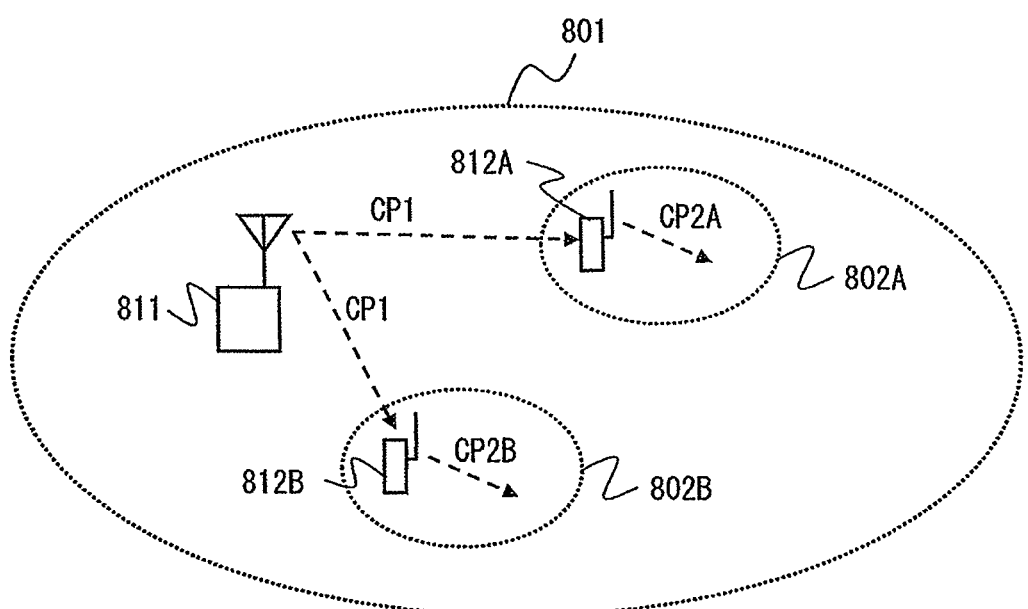
FIG. 32 is a configuration diagram of a radio communication system for explaining background art.

As shown in FIG. 31, the difference between RSCP_OUT measured by the unregistered mobile station 6-3 and RSCP_IN measured by the registered mobile stations 6-1 and 6-2 can be used as an estimated value $LB_E$ of the building penetration loss at the installation place of the femto base station 3. That is, similarly to the femto base station 3, the femto base station 4 can control the transmission power of the femto base station 4 and the registered mobile stations 6-1 and 6-2 according to the magnitude of the building penetration loss at the installation place. Therefore, the femto base station 4 can provide good communication quality inside a building while suppressing interference exerted on communication of other radio stations by radio waves leaked outside the building.

Other Exemplary Embodiments of the Invention

Among radio parameter determination processes described above in the first to fourth exemplary embodiments, calculation processes other than the measurement of the reception quality level of the external radio signal S1, i.e., the relative comparison between measured values of reception quality levels, the calculation of a CPICH transmission power P_tx, and the like may be performed by an apparatus disposed on the upper network 5, e.g., an RNC. In such a case, the radio resource control units 15, 25, 35 and 45 may receive a determined radio parameter(s) from the upper network 5 and supply the received radio parameter to the radio transmission/reception unit 11. That is, the task of each calculation process included in the radio parameter determination procedure, which has been explained as being performed by the femto base stations 1 to 4, can be arbitrarily shared between the femto base stations 1 to 4 and the upper network 5 to which they are connected.

Further, in the above-described first to fourth exemplary embodiments of the invention, cases where the present invention is applied to a radio communication system adopting a W-CDMA mode are explained. However, there is no particular restriction on the radio communication mode to which the present invention is applied. For example, the present invention can be also applied to radio communication systems adopting a TDD (Time Division Duplex) mode in which the same radio frequency is used in both the uplink and downlink in a time-division manner. Further, for example, the present invention can be also applied to radio communication systems adopting an E-UTRAN mode instead of the W-CDMA mode.

Further, in the above-described first to fourth exemplary embodiments of the invention, cases where the present invention is applied to a femto base station are explained. However, the present invention can be also applied, for example, to each of a plurality of radio stations that autonomously form a radio ad-hoc network.

Further, the present invention is not limited to the above-described exemplary embodiments, and needless to say, various modifications can be made within the limits that do not depart from the spirit of the present invention described above.

This application is based upon and claims the benefit of priority from Japanese patent application No. 2008-080744, filed on Mar. 26, 2008, the disclosure of which is incorporated herein in its entirety by reference.

INDUSTRIAL APPLICABILITY

The present invention can be applied to radio resource control techniques used in communication between radio stations.

The invention claimed is:

1. A radio station apparatus that performs radio communication with at least one opposed radio station, comprising:
   an external radio signal reception unit configured to measure a reception quality level of an external radio signal transmitted from an external radio station that is different from any of the radio station apparatus and the at least one opposed radio station;

radio resource control unit configured to obtain measured values of the reception quality level of the external radio signal that are measured by both the external radio signal reception unit and the at least one opposed radio station, and determining a radio parameter relating to radio communication between the radio station apparatus and the at least one opposed radio station based on a relative comparison between the measured values of the reception quality level, wherein when a first condition that the reception quality level measured by the external radio signal reception unit is smaller than a first reference value obtained from the reception quality levels measured by the at least one opposed radio station is satisfied, the radio resource control unit determines the radio parameter such that downlink transmission power from the radio station apparatus to the opposed radio station becomes relatively larger in comparison to when the first condition is not satisfied.

2. The radio station apparatus according to claim 1, wherein when the first condition is satisfied, the radio resource control unit determines the radio parameter such that uplink transmission power from the opposed radio station to the radio station apparatus becomes relatively smaller in comparison to when the first condition is not satisfied.

3. The radio station apparatus according to claim 1, wherein when a second condition that the reception quality level measured by the external radio signal reception unit is larger than a second reference value obtained from the reception quality levels measured by the at least one opposed radio station is satisfied, the radio resource control unit determines the radio parameter such that the downlink transmission power from the radio station apparatus to the opposed radio station becomes relatively smaller in comparison to when the second condition is not satisfied.

4. The radio station apparatus according to claim 3, wherein when both the first and second conditions are not satisfied, the radio resource control unit determines the radio parameter such that the downlink transmission power from the radio station apparatus to the opposed radio station becomes relatively smaller in comparison to when the first condition is satisfied and becomes relatively larger in comparison to when the second condition is satisfied.

5. The radio station apparatus according to claim 1, wherein when a second condition that the reception quality level measured by the radio station apparatus is larger than a second reference value obtained from the reception quality levels measured by the at least one opposed radio station is satisfied, the radio resource control unit determines the radio parameter such that downlink transmission power from the radio station apparatus to the opposed radio station becomes relatively smaller in comparison to when the second condition is not satisfied.

6. The radio station apparatus according to claim 5, wherein when the second condition is satisfied, the radio resource control unit determines the radio parameter such that uplink transmission power from the opposed radio station to the radio station apparatus becomes relatively larger in comparison to when the second condition is not satisfied.

7. The radio station apparatus according to claim 1, wherein the radio resource control unit:
obtains the measured values of the reception quality level measured by the at least one opposed radio station and obtains a measured value of a path loss between the radio station apparatus and the at least one opposed radio station; and determines, when a first condition that a value of the path loss corresponding to a substantial maximum value of the reception quality level is sufficiently greater than a value of the path loss corresponding to a substantial minimum value of the reception quality level is satisfied, the radio parameter such that downlink transmission power from the radio station apparatus to the opposed radio station becomes relatively larger in comparison to when the first condition is not satisfied.

8. The radio station apparatus according to claim 7, wherein when the first condition is satisfied, the radio resource control unit determines the radio parameter such that uplink transmission power from the opposed radio station to the radio station apparatus becomes relatively smaller in comparison to when the first condition is not satisfied.

9. The radio station apparatus according to claim 7, wherein when a second condition that the value of the path loss corresponding to the substantial maximum value of the reception quality level is sufficiently smaller than the value of the path loss corresponding to the substantial minimum value of the reception quality level is satisfied, the radio resource control unit determines the radio parameter such that the downlink transmission power from the radio station apparatus to the opposed radio station becomes relatively smaller in comparison to when the second condition is not satisfied.

10. The radio station apparatus according to claim 9, wherein when both the first and second conditions are not satisfied, the radio resource control unit determines the radio parameter such that the downlink transmission power from the radio station apparatus to the opposed radio station becomes relatively smaller in comparison to when the first condition is satisfied and becomes relatively larger in comparison to when the second condition is satisfied.

11. The radio station apparatus according to claim 1, wherein the radio resource control unit:
obtains the measured values of the reception quality level measured by the at least one opposed radio station and obtains measured values of a path loss between the radio station apparatus and the at least one opposed radio station; and determines, when a second condition that a value of the path loss corresponding to a substantial maximum value of the reception quality level is smaller by more than a reference value than a value of the path loss corresponding to a substantial minimum value of the reception quality level is satisfied, the radio parameter such that a downlink transmission power from the radio station apparatus to the opposed radio station becomes relatively smaller in comparison to when the second condition is not satisfied.

12. The radio station apparatus according to claim 11, wherein when the second condition is satisfied, the radio resource control unit determines the radio parameter such that uplink transmission power from the opposed radio station to the radio station apparatus becomes relatively larger in comparison to when the second condition is not satisfied.

13. The radio station apparatus according to claim 1, wherein the radio resource control unit:
obtains the measured values of the reception quality level measured by the at least one opposed radio station and obtains measured values of a path loss between the radio station apparatus and the at least one opposed radio station; and determines, when a first condition that the opposed radio station for which the reception quality level becomes smallest is same as the opposed radio station for which the path loss becomes smallest is satisfied, the radio parameter such that downlink transmission power from the radio station apparatus to the opposed radio station becomes relatively larger in comparison to when the first condition is not satisfied.

14. The radio station apparatus according to claim 1, wherein the radio resource control unit:
   obtains the measured values of the reception quality level measured by the at least one opposed radio station and obtains measured values of a path loss between the radio station apparatus and the at least one opposed radio station; and
   determines, when a second condition that the opposed radio station for which the reception quality level becomes largest is same as the opposed radio station for which the path loss becomes smallest is satisfied, the radio parameter such that downlink transmission power from the radio station apparatus to the opposed radio station becomes relatively smaller in comparison to when the second condition is not satisfied.

15. The radio station apparatus according to claim 1, wherein
   the at least one opposed radio station comprises a registered radio station that is registered in advance in the radio station apparatus and an unregistered radio station that is not registered in advance in the radio station apparatus, and
   the radio resource control unit determines a radio parameter relating to radio communication between the radio station apparatus and the registered radio station as a function of a difference between the reception quality level measured by at least one of the radio station apparatus and the registered radio station and the reception quality level measured by the unregistered radio station.

16. The radio station apparatus according to claim 15, wherein the radio resource control unit determines the radio parameter such that as the reception quality level measured by at least one of the radio station apparatus and the registered radio station decreases in comparison to the reception quality level measured by the unregistered radio station, downlink transmission power from the radio station apparatus to the registered radio station is increased.

17. The radio station apparatus according to claim 15, wherein the radio resource control unit determines the radio parameter such that as the reception quality level measured by at least one of the radio station apparatus and the registered radio station decreases in comparison to the reception quality level measured by the unregistered radio station, an uplink transmission power from the registered radio station to the radio station apparatus is increased.

18. The radio station apparatus according to claim 1, wherein the radio parameter includes at least one of a transmission power of a certain downlink signal by the radio station apparatus, a maximum value of a total transmission power of all downlink signals by the radio station apparatus, a target value of a received power of an uplink data reception from the opposed radio station in the radio station apparatus, and a maximum value of a total transmission power of all uplink signals by the opposed radio station.

19. A radio resource control method comprising:
   a step (a), by at least one of a first radio station and at least one second radio station capable of communicating with the first radio station, of measuring a reception quality level of an external radio signal transmitted from an external radio station that is different from any of the first and second radio stations, and
   a step (b) of determining a radio parameter relating to radio communication between the first radio station and the at least one second radio station based on a relative comparison between a plurality of measured values of the reception quality level measured in the step (a);
   in the step (a), both the first radio station and the at least one second radio station measure the reception quality level, and the measurement of the reception quality level by the at least one second radio station is performed multiple times by the at least one second radio station, and
   in the step (b), when a first condition that the reception quality level measured by the first radio station is smaller than a first reference value determined from the reception quality levels measured by the at least one second radio station is satisfied, the radio parameter is determined such that downlink transmission power from the first radio station to the second radio station becomes relatively larger in comparison to when the first condition is not satisfied.

20. The radio resource control method according to claim 19, wherein in the step (b), when the first condition is satisfied, the radio parameter is determined such that uplink transmission power from the second radio station to the first radio station becomes relatively smaller in comparison to when the first condition is not satisfied.

21. The radio resource control method according to claim 19, wherein in the step (b), when a second condition that the reception quality level measured by the first radio station is larger than a second reference value determined from the reception quality levels measured by the at least one second radio station is satisfied, the radio parameter is determined such that the downlink transmission power from the first radio station to the second radio station becomes relatively smaller in comparison to when the second condition is not satisfied.

22. The radio resource control method according to claim 21, wherein in the step (b), when both the first and second conditions are not satisfied, the radio resource is determined such that the downlink transmission power from the first radio station to the second radio station becomes relatively smaller in comparison to when the first condition is satisfied and becomes relatively larger in comparison to when the second condition is satisfied.

23. The radio resource control method according to claim 19, wherein
   in the step (a), both the first radio station and the at least one second radio station measure the reception quality level, and the measurement of the reception quality level by the at least one second radio station is performed multiple times by the at least one second radio station, and
   in the step (b), when a second condition that the reception quality level measured by the first radio station is larger than a second reference value determined from the reception quality levels measured by the at least one second radio station is satisfied, the radio parameter is determined such that downlink transmission power from the first radio station to the second radio station becomes relatively smaller in comparison to when the second condition is not satisfied.

24. The radio resource control method according to claim 23, wherein the step (b) includes determining, when the second condition is satisfied, the radio parameter such that uplink transmission power from the second radio station to the first radio station becomes relatively larger in comparison to when the second condition is not satisfied.

25. The radio resource control method according to claim 19, wherein
   the step (a) includes:
      measuring, by the at least one second radio station, the reception quality level, and measuring a path loss between the first radio station and the at least one second radio station, and the step (b) includes:

determining, when a first condition that a value of the path loss corresponding to a substantial maximum value of the reception quality levels is sufficiently greater than a value of the path loss corresponding to a substantial minimum value of the reception quality levels is satisfied, the radio parameter such that downlink transmission power from the first radio station to the second radio station becomes relatively larger in comparison to when the first condition is not satisfied.

26. The radio resource control method according to claim 25, wherein the step (b) includes determining, when the first condition is satisfied, the radio parameter such that uplink transmission power from the second radio station to the first radio station becomes relatively smaller in comparison to when the first condition is not satisfied.

27. The radio resource control method according to claim 25, wherein the step (b) includes determining, when a second condition that a value of the path loss corresponding to a substantial maximum value of the reception quality level is sufficiently smaller than a value of the path loss corresponding to a substantial minimum value of the reception quality level is satisfied, the radio parameter such that the downlink transmission power from the first radio station to the second radio station becomes relatively smaller in comparison to when the second condition is not satisfied.

28. The radio resource control method according to claim 27, wherein the step (b) includes determining, when both the first and second conditions are not satisfied, the radio resource is determined such that the downlink transmission power from the first radio station to the second radio station becomes relatively smaller in comparison to when the first condition is satisfied and becomes relatively larger in comparison to when the second condition is satisfied.

29. The radio resource control method according to claim 19, wherein the step (a) includes:

measuring, by the at least one second radio station, the reception quality level, and measuring a path loss between the first radio station and the at least one second radio station, and the step (b) includes:

determining, when a second condition that a value of the path loss corresponding to a substantial maximum value of the reception quality levels is smaller by more than a reference value than a value of the path loss corresponding to a substantial minimum value of the reception quality levels is satisfied, the radio parameter such that downlink transmission power from the first radio station to the second radio station becomes relatively smaller in comparison to when the second condition is not satisfied.

30. The radio resource control method according to claim 29, wherein the step (b) includes determining, when the second condition is satisfied, the radio parameter such that uplink transmission power from the second radio station to the first radio station becomes relatively larger in comparison to when the second condition is not satisfied.

31. The radio resource control method according to claim 19, wherein the step (a) includes:

measuring, by the at least one second radio station, the reception quality level, and measuring a path loss between the first radio station and the at least one second radio station, and the step (b) includes:

determining, when a first condition that the second radio station for which the reception quality level becomes smallest is same as the second radio station for which the path loss becomes smallest is satisfied, the radio parameter such that downlink transmission power from the first radio station to the second radio station becomes relatively larger in comparison to when the first condition is not satisfied.

32. The radio resource control method according to claim 19, wherein the step (a) includes:

measuring, by the at least one second radio station, the reception quality level, and measuring a path loss between the first radio station and the at least one second radio station, and the step (b) includes:

determining, when a second condition that the second radio station for which the reception quality level becomes largest is same as the second radio station for which the path loss becomes smallest is satisfied, the radio parameter such that downlink transmission power from the first radio station to the second radio station becomes relatively smaller in comparison to when the second condition is not satisfied.

33. The radio resource control method according to claim 19, wherein the at least one second registered radio station comprises a registered radio station that is registered in advance in the first radio station and an unregistered radio station that is not registered in advance in the first radio station, the step (a) includes measuring, by at least one of the first radio station and the registered radio station, the reception quality level, and the step (b) includes determining a radio parameter relating to radio communication between the first radio station and the registered radio station as a function of a difference between the reception quality level measured by at least one of the first radio station and the registered radio station and the reception quality level measured by the unregistered radio station.

34. The radio resource control method according to claim 33, wherein the step (b) includes determining the radio parameter such that as the reception quality level measured by at least one of the first radio station and the registered radio station decreases in comparison to the reception quality level measured by the unregistered radio station, downlink transmission power from the first radio station to the registered radio station is increased.

35. The radio resource control method according to claim 33, wherein the step (b) includes determining the radio parameter such that as the reception quality level measured by at least one of the first radio station and the registered radio station decreases in comparison to the reception quality level measured by the unregistered radio station, uplink transmission power from the registered radio station to the first radio station is increased.

36. A non-transitory recording medium storing a radio station control program to cause a computer to execute control processing relating to a radio station apparatus, the control processing comprising:

a process (a) of obtaining measured values of a reception quality level of an external radio signal that are obtained by at least one of the radio station apparatus and at least one opposed radio station by measuring the reception quality level, the external radio signal being a radio signal transmitted from an external radio station that is different from any of the radio station apparatus and the opposed radio station; and a process (b) of determining a radio parameter relating to radio communication between the radio station apparatus and the at least one opposed radio station based on a relative comparison between the measured values of the reception quality level obtained in the process (a), wherein in the process (a), both the first radio station and the at least one second radio station measure the reception quality level, and the measurement of the reception quality level by the at least one second radio station is performed multiple times by the at least one second radio station, and wherein in the process (b), when a first condition that the reception quality level measured by the first radio station is smaller than first reference value determined from the reception quality levels measured by the at least one second radio station is satisfied, the radio parameter is determined such that downlink transmission power from the first radio station to the second radio station becomes relatively larger in comparison to when the first condition is not satisfied.

37. A radio communication system comprising:

a first radio station;

at least one second radio station capable of communicating with the first radio station;

the first radio station and the at least one second radio station each configured to measure a reception quality level of an external radio signal transmitted from an external radio station that is different from any of the first and second radio stations; and radio resource control unit configured to determine a radio parameter relating to radio communication between the first radio station and the at least one second radio station based on a relative comparison between a plurality of measured values of the reception quality level obtained by both the first radio station and the at least one second radio station, wherein when a first condition that the reception quality level measured by the first radio station is smaller than a first reference value obtained from the reception quality levels measured by the at least one second radio station is satisfied, the radio resource control unit determines the radio parameter such that downlink transmission power from the radio station apparatus to the second radio station becomes relatively larger in comparison to when the first condition is not satisfied.

* * * * *